United States Patent
Wattanapan et al.

(10) Patent No.: US 10,088,058 B2
(45) Date of Patent: Oct. 2, 2018

(54) METHODS, SYSTEMS, AND DEVICES FOR CONTROLLING OPERATION OF A VALVE

(71) Applicant: THAI OIL PUBLIC COMPANY LIMITED, Bangkok (TH)

(72) Inventors: Kriangsak Wattanapan, Bangkok (TH); Thirasak Pairojpiriyakul, Bangkok (TH); Prapod Ruthaiputpong, Bangkok (TH); Anuntasak Suksasilp, Bangkok (TH); Khwanchai Chaiyarerk, Bangkok (TH); Adisorn Poohsai, Bangkok (TH); Vatcharaphong Thongthai, Bangkok (TH)

(73) Assignee: Thai Oil Public Company Limited, Bangkok (TH)

( * ) Notice: Subject to any disclaimer, the term of this patent is extended or adjusted under 35 U.S.C. 154(b) by 3 days.

(21) Appl. No.: 15/128,776

(22) PCT Filed: Aug. 21, 2014

(86) PCT No.: PCT/TH2014/000040
§ 371 (c)(1),
(2) Date: Sep. 23, 2016

(87) PCT Pub. No.: WO2016/028236
PCT Pub. Date: Feb. 25, 2016

(65) Prior Publication Data
US 2018/0209561 A1   Jul. 26, 2018

(51) Int. Cl.
*F16K 3/02* (2006.01)
*F16K 31/53* (2006.01)
(Continued)

(52) U.S. Cl.
CPC .............. *F16K 3/0254* (2013.01); *F16H 3/54* (2013.01); *F16H 3/64* (2013.01); *F16K 31/05* (2013.01);
(Continued)

(58) Field of Classification Search
CPC ........ F16K 3/0254; F16K 31/53; F16K 31/05; F16H 2200/2094; F16H 2200/2005;
(Continued)

(56) References Cited

U.S. PATENT DOCUMENTS

| 783,007 A | * | 2/1905 | Allen et al. | ......... F16K 31/0655 |
| | | | | 251/248 |
| 1,784,094 A | | 9/1930 | Fletcher | |

(Continued)

FOREIGN PATENT DOCUMENTS

WO   2016/028236 A2   2/2016

OTHER PUBLICATIONS

International Search Report of the International Searching Authority for PCT/TH2014/000040, dated Apr. 1, 2016.
(Continued)

*Primary Examiner* — John Bastianelli
(74) *Attorney, Agent, or Firm* — Baker & McKenzie LLP

(57) ABSTRACT

Example embodiments relate generally to portable devices for controlling operation of a valve. The apparatus may comprise a main body, an anchoring portion, a contacting member, and a gear assembly. The anchoring portion may be securable to the main body and operable to restrict a movement of the main body relative to the valve body. The contacting member may be securable to the main body and rotatable relative to the main body. The contacting member may be operable to contact with a portion of the control member. The gear assembly may be configurable to provide, from an output portion, one or more of a plurality of (Continued)

selectable output torques to the control member via the contacting member based on an input torque received from an input portion. The magnitude of each selectable output torque may be greater than or equal to the magnitude of the input torque.

20 Claims, 16 Drawing Sheets

(51) Int. Cl.
    *F16K 31/05*     (2006.01)
    *F16H 3/64*     (2006.01)
    *F16H 3/54*     (2006.01)

(52) U.S. Cl.
    CPC ...... *F16K 31/53* (2013.01); *F16H 2200/2094* (2013.01)

(58) Field of Classification Search
    CPC ....... F16H 2200/2007; F16H 2200/201; F16H 3/54; F16H 3/64
    USPC ....... 251/248–250.5, 291, 229; 475/323, 326
    See application file for complete search history.

(56) References Cited

U.S. PATENT DOCUMENTS

| | | | | |
|---|---|---|---|---|
| 2,674,903 | A * | 4/1954 | Doster | F16K 31/53 |
| | | | | 251/248 |
| 3,108,487 | A | 10/1963 | Sandler | |
| 4,346,728 | A * | 8/1982 | Sulzer | F16K 29/00 |
| | | | | 251/229 |
| 2008/0315139 | A1 | 12/2008 | Stone et al. | |
| 2012/0068098 | A1 | 3/2012 | Arai | |
| 2012/0077634 | A1* | 3/2012 | Thompson | F16H 3/721 |
| | | | | 475/323 |
| 2012/0132838 | A1 | 5/2012 | Staffiere et al. | |

OTHER PUBLICATIONS

Written Opinion of the International Searching Authority for PCT/TH2014/000040, dated Apr. 1, 2016.

Search History of the International Searching Authority for PCT/TH2014/000040, dated Apr. 1, 2016.

\* cited by examiner

METHODS, SYSTEMS, AND DEVICES FOR CONTROLLING OPERATION OF A VALVE

TECHNICAL FIELD

The present disclosure relates generally to systems, methods and devices for controlling an operation of a valve.

BACKGROUND

In general, a valve is utilized to control the passage (or flow) of liquids, gases, solids, and combinations thereof, traveling through an interior passageway of the valve. Valve control is typically achievable by mechanically directing an internally-mounted valve gate member to a desired position, such as a completely closed position, a completely opened position, a partially closed position, and a partially opened position. Valve gate members can be directed to such desired positions in a variety of ways. In a rotary valve 100, such as the example illustrated in FIG. 1, an externally-mounted control member 110, such as one resembling a wheel (hereinafter a "rotary wheel"), can be manually rotated by a field personnel to control movement of the valve gate member 150 (and correspondingly, the contents passing therethrough).

A typical rotary valve 100 comprises a control member 110, such as a circular wheel (or "rim") 120, in communication with one or more elongated members (or "spokes") 130. In operation, when a field personnel contacts with the rim 120 and/or the spoke(s) 130 and effects rotation of the rotary wheel 110 in a first direction with a sufficient amount of energy, the valve gate member may correspondingly move towards a closed (or opened) position. Similarly, when a field personnel effects rotation of the rotary wheel 110 in a second direction opposite to the first direction using a sufficient amount of energy, the valve gate member may correspondingly move towards an opened (or closed) position.

Valves come in a variety of different configurations, types, shapes, and sizes, and may be installed in a variety of different ways. For example, rotary valves 100 may be installed by orienting the rim 120 to be substantially parallel to the ground and facing upwards, orienting the rim 120 to be substantially parallel to the ground and facing downwards, orienting the rim 120 to be substantially perpendicular to the ground, and orienting the rim 120 at angles in between. As another example, rotary wheels 110 are available in a variety of different configurations and sizes, including various combinations of different diameters of the rim 120, thicknesses of the rim 120, number of spokes 130, thicknesses of the spokes 130, lengths of the spokes 130, and orientation of the spokes 130 and/or angle of the spokes 130 relative to a plane formed by the rim 120. In yet another example, the valve body 140 of the rotary valve 100 may exist in a variety of different shapes, sizes, and diameters, and may or may not comprise an exterior protective surface.

SUMMARY

It is recognized herein that field personnel often encounter problems with effecting the control of valves, including rotary valves, such as in situations wherein the valves are located in distant remote locations (such as in large refineries and campuses), the valves have been exposed to outside elements (such as rain, snow, salt, etc.), the environmental situation at the time make it more difficult for field personnel to operate a valve (such as during a rain storm, snow storm, severe windy conditions, etc.), the valves are closely and/or tightly installed nearby other structures (such as pipes, other valves, the ground, a ceiling, a wall, etc.), the valves have a particular shape/size that makes it difficult for the particular field personnel to rotate, etc.

Present example embodiments relate generally to systems, methods, and devices for controlling operation of a valve.

In an example embodiment, a portable apparatus is provided for controlling an operation of a valve. The valve may comprise a control member and a valve body. The apparatus may comprise a main body, an anchoring portion, a contacting member, and a gear assembly. The anchoring portion may be securable to the main body and operable to restrict a movement of the main body relative to the valve body when in contact with the valve body. The contacting member may be securable to the main body and rotatable relative to the main body. The contacting member may be operable to contact with a portion of the control member. The gear assembly comprises an input portion, an output portion, and one or more sub-gear assemblies in communication with the input portion and the output portion. The gear assembly may be securable relative to the main body and the contacting member. The gear assembly may be configurable to provide, from the output portion, one or more of a plurality of selectable output torques to the control member via the contacting member based on an input torque received from the input portion. The magnitude of each selectable output torque may be greater than or equal to the magnitude of the input torque.

In another example embodiment, a portable apparatus is provided for controlling an operation of a valve. The valve may comprise a control member and a valve body. The apparatus may comprise a main body, a gear assembly, a contacting member, and an anchoring portion. The gear assembly may be securable to the main body and may comprise an input port, an output port, and a planetary gear assembly. The planetary gear assembly may be configurable to provide one or more of a plurality of selectable output torques at the output port based on an input torque received at the input port. The contacting member may be securable to the main body and rotatable relative to the main body. The contacting member may be operable to effect rotation of the control member relative to the main body when provided with a selected output torque from the output port of the gear assembly. The anchoring portion comprises a first connecting portion formed by a first surface of the anchoring portion and a second connecting portion formed by a second surface of the anchoring portion. The first and second connecting portions may be configurable to secure to the main body and a portion of the valve body, respectively. The anchoring portion may be configurable to restrict a movement of the main body relative to the valve body. The magnitude of each selectable output torque may be greater than or equal to the magnitude of the input torque.

In another example embodiment, a portable apparatus is provided for controlling an operation of a valve. The valve may comprise a control member and a valve body. The apparatus may comprise a main body, a configurable anchoring portion, a configurable contacting member, and a gear assembly. The configurable anchoring portion may be securable to the main body and adjustably configurable to restrict a movement of the main body relative to the valve body when in contact with the valve body. The configurable contacting member may be securable to the main body and rotatable relative to the main body. The contacting member may be adjustably configurable to contact with a portion of the control member. The gear assembly may be operable to provide an output torque to the control member via the contacting member when an input torque is received by the gear assembly. The magnitude of the output torque may be greater than the magnitude of the input torque.

In another example embodiment, a portable apparatus is provided for controlling an operation of a valve. The valve may comprise a control member and a valve body. The apparatus may comprise a main body, an anchoring portion, a gear assembly, and a contacting member. The main body may define a first axis. The main body may comprise a first connecting portion at a first end of the main body and a second connecting portion of the main body. The anchoring portion may comprise a first connecting portion of the anchoring portion and a second connecting portion of the anchoring portion. The first and second connecting portions of the anchoring portion are operable to secure to the second end of the main body and a portion of the valve body, respectively. The anchoring portion may be operable to restrict a movement of the main body relative to the valve body about the first axis when the anchoring portion is engaged in a substantially locked position. The gear assembly may comprise a drive gear assembly and a driven gear assembly. The drive gear assembly may be securable to the second connecting portion of the main body. The drive gear assembly may be operable to rotate relative to the second connecting portion of the main body when actuated by an energy source. The driven gear assembly may be drivable by the drive gear assembly. The driven gear assembly may be securable to the first connecting portion of the main body and operable to be rotated relative to the first connecting portion of the main body when the drive gear assembly is rotated. The contacting member may be securable to the main body and rotatable relative to the main body. The contacting member may be configurable to contact with a portion of the control member. When the energy source actuates the drive gear assembly with a first torque, the gear assembly is operable to drive the drive gear assembly with the first torque. The gear assembly is also operable to drive the driven gear assembly with a second torque, the magnitude of the second torque being greater than the magnitude of the first torque by at least a factor of 10. The gear assembly is also operable to drive the control member via the contacting portion with the second torque.

BRIEF DESCRIPTION OF THE DRAWINGS

For a more complete understanding of the present disclosure, example embodiments, and their advantages, reference is now made to the following description taken in conjunction with the accompanying drawings, in which like reference numbers indicate like features, and.

Although similar reference numbers may be used to refer to similar elements for convenience, it can be appreciated that each of the various example embodiments may be considered to be distinct variations.

DETAILED DESCRIPTION

Figure 1:
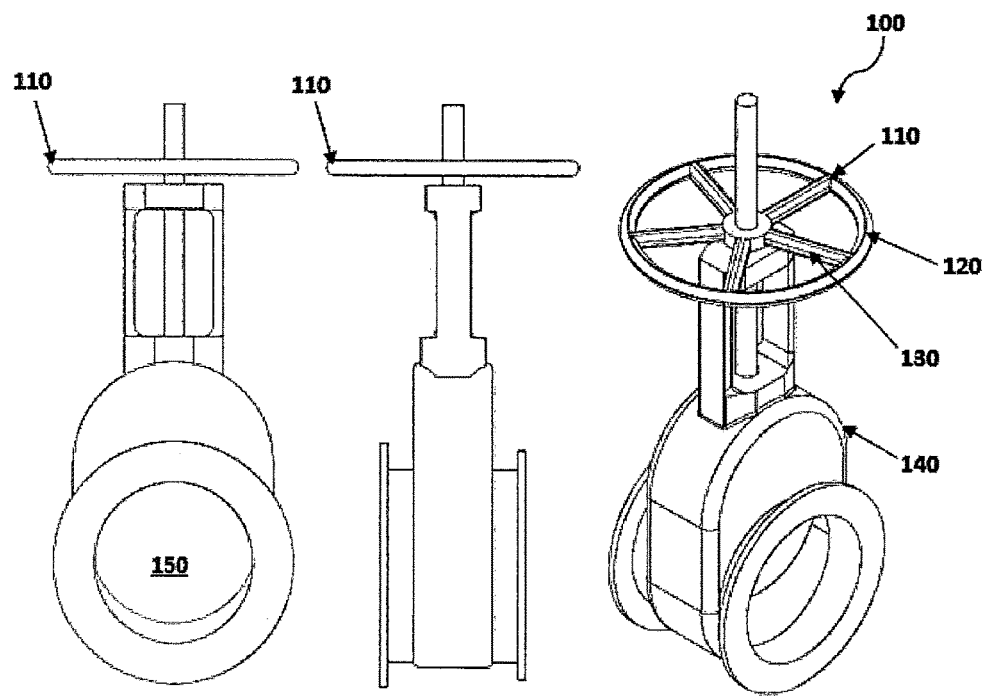
FIG. 1 is an illustration of a front view, side view, and perspective view of a typical rotary valve.

Example embodiments will now be described hereinafter with reference to the accompanying drawings, which form a part hereof, and which illustrate example embodiments which may be practiced. As used in the disclosures and the appended claims, the terms "example embodiment" and "present embodiment" do not necessarily refer to a single embodiment, although they may, and various example embodiments may be readily combined and interchanged, without departing from the scope or spirit of example embodiments. Furthermore, the terminology as used herein is for the purpose of describing example embodiments only and is not intended to be limitations. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Today, controlling the flow of contents, including liquids, gases, solids, and combinations thereof, attempting to pass through a valve is typically achievable by mechanically directing an internally-mounted valve gate member to a desired position, such as a completely closed position, a completely opened position, a partially opened position, and partially closed position. Valve gate members can be controlled to such positions by actuating a control member of the valve, such as by contacting a part of the rim and/or one or more spokes of a rotary valve and applying energy to effect the rotation of the rotary wheel, or the like.

Conventionally, when a field personnel is required to control operation of a valve, the field personnel will typically grab (with one or both hands) one or more portions of the rim and/or spoke(s) and attempt to apply at least a sufficient amount of energy to effect rotation of the rotary wheel. Oftentimes, rotation of a rotary wheel will require a significant amount of energy to be applied, particularly to effect the initial rotation from a static position. In such situations, one field personnel may find it very difficult or impossible to rotate the rotary wheel using his/her bare hands. Typically, the field personnel may request a second field personnel to assist, which will involve a waiting time for the second field personnel to arrive. Such a wait time, however, may equate to a creation or an increase in one or more of undesirable financial, safety, and environmental consequences.

Alternatively, the field personnel may retrieve one or more elongated metal rods to assist in rotating the rotary wheel. When available and retrievable, one end of a long metal rod is inserted into the wheel, and the other end is for use by the field personnel to push downward (or upward) with a force (such as by using the field personnel's arms, body, and weight) that may be greater than that achievable by rotating the wheel with bare hands. It is recognized herein, however, that such a solution may not always be suitable or available, such as in non-ideal environmental situations (such as during a rain storm, snow storm, severe windy conditions, etc.), situations wherein there is insufficient space around the valve (such as nearby solid structures, such as pipes, other valves, the ground, a ceiling, a wall, etc.), and situations wherein such an elongated metal rod is not available.

It is recognized herein that field personnel often encounter problems, such as described above, with effecting the control of valves, including rotary valves, particularly in situations wherein the valves are located in distant remote locations (such as in large refineries and campuses), the valves have been exposed to outside elements (such as rain, snow, salt, etc.), the environmental situation at the time is not ideal (such as during a rain storm, snow storm, severe windy conditions, etc.), the valves are closely and/or tightly installed nearby other solid structures (such as pipes, other valves, the ground, a ceiling, a wall, etc.), the valves have a particular shape/size that makes it difficult for the particular field personnel to rotate, and the like.

Present example embodiments relate generally to a portable apparatus for controlling an operation of a valve. The valve may comprise a control member and a valve body. The apparatus may comprise a main body, an anchoring portion, a contacting member, and a gear assembly. The anchoring portion may be securable to the main body and operable to restrict a movement of the main body relative to the valve body when in contact with the valve body. The contacting member may be securable to the main body and rotatable relative to the main body. The contacting member may be operable to contact with a portion of the control member. The gear assembly comprises an input portion, an output portion, and one or more sub-gear assemblies in communication with the input portion and the output portion. The gear assembly may be securable relative to the main body and the contacting member. The gear assembly may be configurable to provide, from the output portion, one of a plurality of selectable output torques to the control member via the contacting member based on an input torque received from the input portion. The magnitude of each selectable output torque may be greater than or equal to the magnitude of the input torque.

Present example embodiments also relate generally to a portable apparatus for controlling an operation of a valve. The valve may comprise a control member and a valve body. The apparatus may comprise a main body, a configurable anchoring portion, a configurable contacting member, and a gear assembly. The configurable anchoring portion may be securable to the main body and adjustably configurable to restrict a movement of the main body relative to the valve body when in contact with the valve body. The configurable contacting member may be securable to the main body and rotatable relative to the main body. The contacting member may be adjustably configurable to contact with a portion of the control member. The gear assembly may be operable to provide an output torque to the control member via the contacting member when an input torque is received by the gear assembly. The magnitude of the output torque may be greater than the magnitude of the input torque.

Figure 2A:
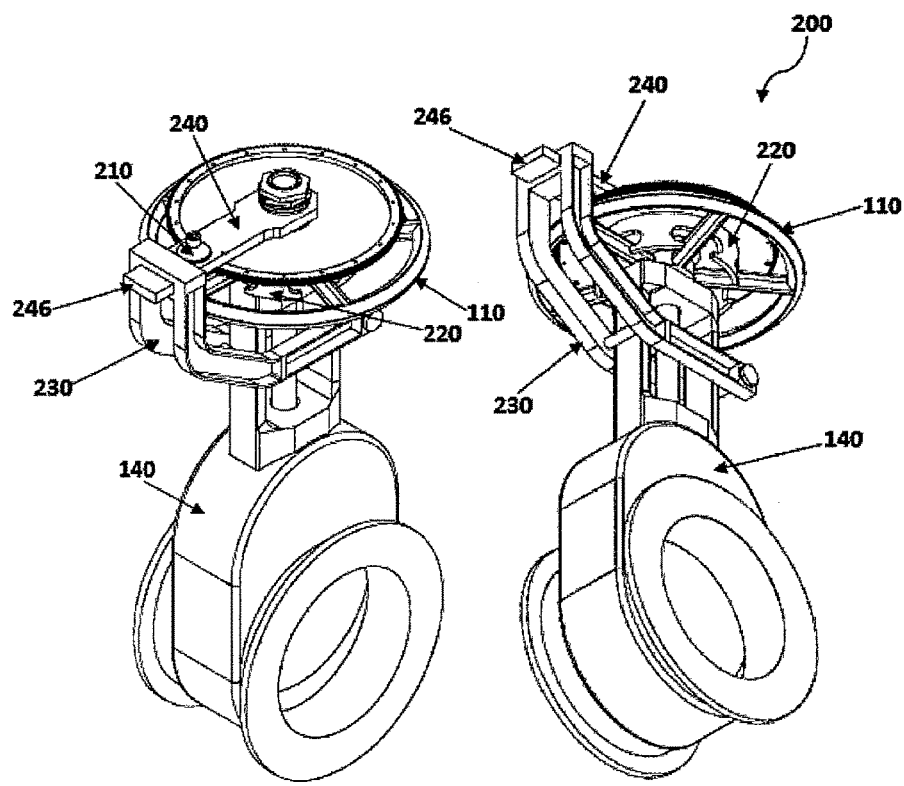
FIG. 2A is a perspective view of an example embodiment of an apparatus attached to a valve.
Figure 2B:
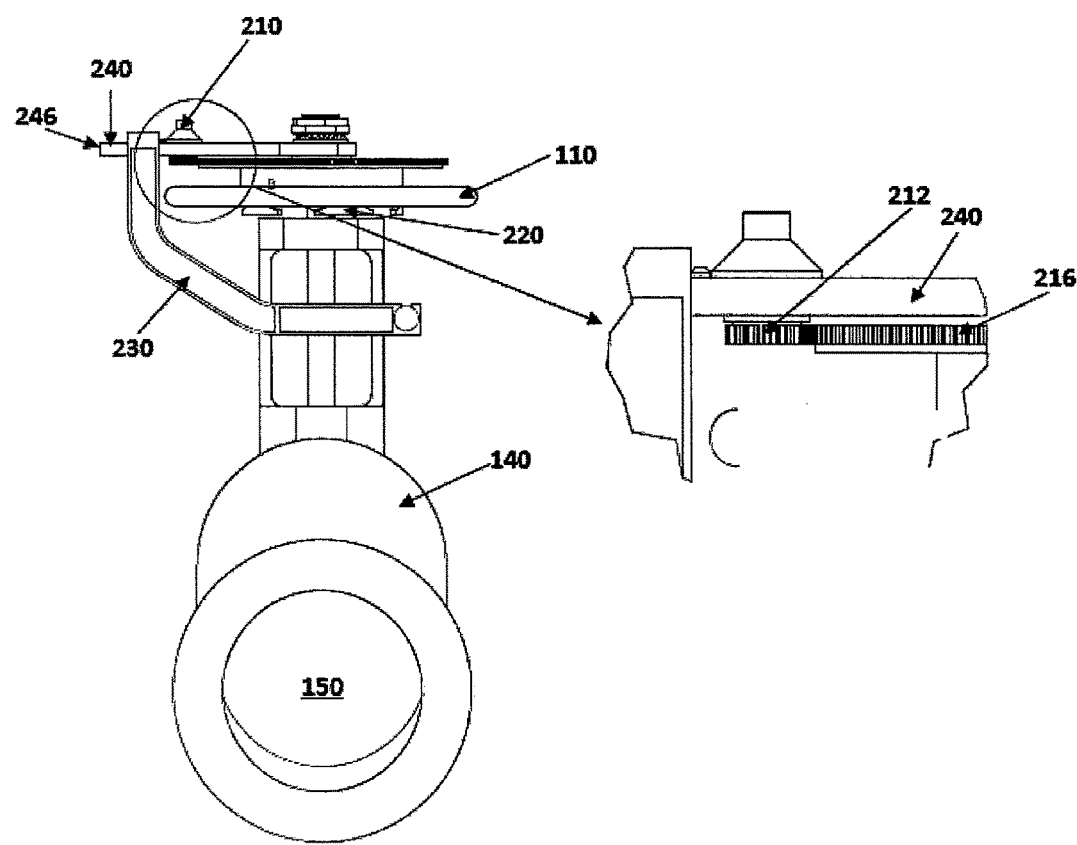
FIG. 2B is a front view of the example embodiment of the apparatus of FIG. 2A attached to a valve (left) and a close up view (right) of a gear assembly of the apparatus.

FIGS. 2A and 2B are upper and lower perspective views, respectively, of an example embodiment of a portable apparatus attached to a valve, such as the valve 100 illustrated in FIG. 1. The valve 100 may comprise a controllable internally-mounted valve gate member operable to correspondingly control the flow of liquids, gases, solids, and combinations thereof, passing through the valve 100. The internally-mounted valve gate member may be controllable by an externally-mounted control member 110, such as a rotary wheel. It is to be understood herein that the valve 100 may comprise any one or more mechanisms known in the art, which may be internally-mounted in part or in whole within the valve body 140 or may form at least a part of the valve body 140, for relaying control commands received in the form of rotational movements of the externally-mounted control member 110 to control the internally-mounted valve gate member.

As shown in FIGS. 2A, 2B, 3A and 3B, example embodiments of the portable apparatus may comprise an anchoring portion 230, a contacting member 220, and a gear assembly 210. The portable apparatus may further comprise a main body 240. The main body 240 may be any one or more of a unitary body, a body comprising a plurality of fixedly secured and/or adjustable parts, an elongated body, and/or a body comprising one or more shapes, so long as the main body 240 provides for, among other things, a structurally rigid body and cooperation with at least the anchoring portion to restrict undesirable movements, bending, breaking, sliding, and/or coming apart of the portable apparatus from the valve 100 when in operation.

The main body 240 may comprise an input portion 242 operable to receive an input torque. The input torque may be provided by one or more energy sources (not shown), such as a pneumatic source, an electric source, a manual tool, and/or a source comprising one or more persons. Although input portion 242 is shown in FIGS. 2 and 3 as being accessible by energy sources from the top elongated surface of main body 240, it is to be understood herein that input portion 242 may also be accessible by energy sources from end 246 in example embodiments.

Figure 3A:
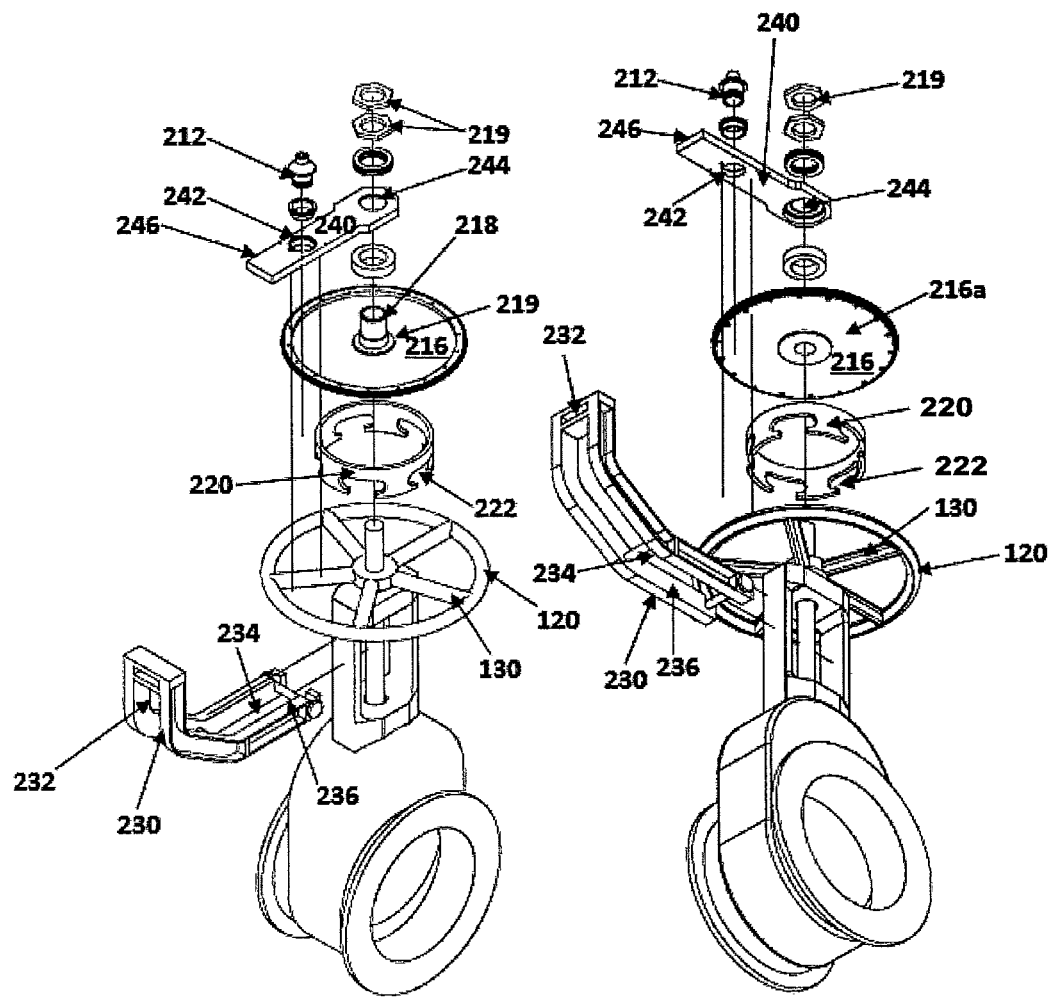
FIG. 3A is an upper (left) and lower (right) exploded view of the example embodiment of the apparatus of FIG. 2A for use in controlling an operation of a valve.
Figure 3B:
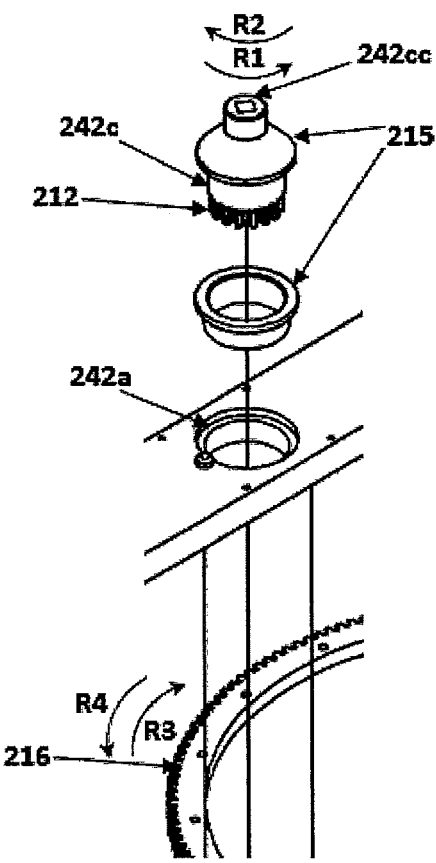
FIG. 3B is a close up exploded view of a gear assembly of the example embodiment of the apparatus of FIG. 2A.

The input portion 242 may comprise a recessed portion 242a (as shown in FIG. 3B), such as a hole, a bore, a cavity, a recess, or the like, formed by a surface. The input portion 242 may further comprise a first elongated member 242c (as shown in FIG. 3B) fixably securable in the said recessed portion 242a in such a way that the first elongated member 242c is provided in a substantially fixed position relative to the main body 240. Furthermore, an exposable end 242cc (as shown in FIG. 3B) of the first elongated member 242c may be accessible to secure (or connect, attach, or mate) to the energy source and cause the first elongated member 242c to rotate in a first direction R1, a second direction R2, or any one of directions R1 and R2 while in the substantially fixed position relative to the main body 240 when energy is provided or applied by the energy source. For example, the energy source may be a pneumatic tool (not shown), which when activated is operable to translate high pressured gas into rotation of an output port (not shown) of the pneumatic tool. In this example, the output port may comprise a recessed portion that is fixably securable to said exposable end 242cc of said first elongated member 242c. In operation, when the pneumatic tool (energy source) is activated and secured to said first elongated member 242c, the output port of the pneumatic tool may be rotated and correspondingly effect rotation R1 and/or R2 of the first elongated member 242c.

In another example, a manual tool (not shown), such as a wheel or a wrench having a recessed portion that is also fixably securable to said exposable end 242cc of said first elongated member 242c, may be connected to said exposed end 242cc of said first elongated member 242c instead of the pneumatic tool. Rotation of the first elongated member 242c may then be effected by a field personnel manually rotating the manual tool.

As will be further explained below, example embodiments of the portable apparatus are operable to receive, as input, a first torque, and operable to translate the input first torque to an output second torque, the magnitude of the output second torque being greater than the magnitude of the input first torque. Accordingly, it is recognized herein that the use of an energy source, such as a manual tool, pneumatic tool, and electrical tool, to rotate the rotary wheel 110 using example embodiments will solve many of the existing problems described above and herein, since example embodiments provide for, among other things, less input torque requirements than would be required to rotate the same rotary wheel 110 without example embodiments of the portable apparatus (such as by using bare hands to rotate the rotary wheel).

The first elongated member 242c is fixedly attached to a gear assembly 210 comprising drive gear 212 and driven gear 216 in such a way as to effect rotation R1 and/or R2 of the drive gear 212 when the elongated member 242c is rotated R1 and/or R2. It is to be understood herein that the first elongated member 242c may be fixably securable in a central recessed portion of the drive gear 212 and prevented from coming away from the drive gear 212 at one or both ends through use of one or more securing elements 215, such as a nut or the like. Alternatively, the said first elongated member 242c may be fixedly secured to and/or integrated with one or more surfaces of the drive gear 212 in example embodiments.

Example embodiments of the gear assembly 210 further comprise a driven gear 216 drivable by the drive gear 212. In this regard, it is to be understood that the drive gear 212 and the driven gear 216 are provided in such a way that the absolute value or magnitude of the gear ratio is greater than 1:1. In example embodiments, the magnitude of the gear ratio is at least 10:1, which will enable the magnitude of an input torque supplied by an energy source to be increased by a factor of at least 10. In other words, the torque applied to the rotary wheel 110 will be at least ten times larger in magnitude than the input torque. In the example embodiment wherein the magnitude of the gear ratio is 10:1, the drive gear 212 may comprise 10 teeth and the driven gear 216 may comprise 100 teeth. Other example embodiments may include a magnitude of the gear ratio being greater than 10:1, such as a gear ratio being at least 20:1, 30:1, 40:1, 50:1, or more, with a corresponding number of teeth in the drive gear 212 and driven gear 216.

As illustrated in FIGS. 2 and 3, the driven gear 216 may be fixably securable to the main body 240 in such a way that the driven gear 216 is drivable (rotatable R1 and/or R2) by the drive gear 212 while also substantially fixed in position relative to the main body 240. In an example embodiment, this may be achievable by a second elongated member 218, as shown in FIG. 3A, operable to be fixably securable in a second recessed portion 244 (as shown in FIG. 3A) of the main body 240 and prevented from coming away from the main body 240 at a first end through use of one or more securing elements 219, such as a nut or the like. It is to be understood herein that the said second elongated member 218 may be fixedly secured to and/or integrated with one or more surfaces of the driven gear 216 in example embodiments. Alternatively, the second elongated member 218 may be fixably securable in a central recessed portion (not shown) of the driven gear 216 in example embodiments, and prevented from coming away from the driven gear 216 at a second end through use of one or more securing elements 219, such as a nut or the like.

As illustrated in the example embodiment of FIGS. 2 and 3, the first elongated member 242c and the second elongated member 218, both restricted to a fixably securable position relative to the main body 240, may also be operable to maintain the positions of the drive gear 212 and the driven gear 216 relative to each other. In doing so, the drive gear 212 is operable to drive R3 and/or R4 the driven gear 216.

An example embodiment of the portable apparatus 200 further comprises a contacting member 220. The contacting member 220 may be fixedly secured to one or more surfaces 216a of the driven gear 216, either directly or indirectly, and may be operable to correspondingly rotate R3 and/or R4 when the driven gear 216 is rotated R3 and/or R4. The contacting member 220 may be any one or more of a unitary body, a body comprising a plurality of fixedly secured and/or adjustable parts, an annular body, and/or a body comprising one or more shapes, so long as the contacting member provides for, among other things, a structurally rigid body and cooperation with at least the main body 240 to restrict undesirable movements, bending, breaking, sliding, and/or coming apart of the contacting member 220 from the rotary wheel 110 when in operation. The contacting member 220 may comprise one or more contacting portions 222. In example embodiments, the one or more contacting portions 222 may be adjustable in such a way as to contact with and/or receive one or more portions of the rim 120 of the rotary wheel and/or a portion of one or more spokes 130 of the rotary wheel so as to effect rotation of the rotary wheel 110 via the contacting member 220 when the driven gear 216 is rotated R3 and/or R4. An example is illustrated wherein elongated portions of the contacting member 220 may be operable to securably extend or contract in length to fit a plurality of rotary wheel 110 sizes and diameters.

An example embodiment of the portable apparatus 200 further comprises an anchoring portion 230. The anchoring portion 230 may be any one or more of a unitary body, a body comprising a plurality of fixedly secured and/or adjustable parts, an elongated body, and/or a body comprising one or more shapes, so long as the anchoring portion 230 provides for, among other things, a structurally rigid body and cooperation with at least the main body 240 to restrict undesirable movements, bending, breaking, sliding, and/or coming apart of the portable apparatus 200 from the valve 100 when in operation. The anchoring portion 230 may comprise a first recessed portion 232 and a second recessed portion 234. When the first recessed portion 232 is provided, the first recessed portion 232 is operable to receive a portion 246 of the main body 240 and secure to the main body 240 when in a substantially locked position. The second recessed portion 234 is adjustable in such a way as to contact with and/or receive one or more portions of the valve body 140, and to secure to the valve body 140 when in a substantially locked position. Such may be achievable by providing one or more sides 236 of the second recessed portion 234 operable to be opened, moved, and/or removed in part or in whole so as to enable receiving a portion of the valve body 140.

When the said first 232 and second 234 recessed portions are fixably secured to the main body 240 and the valve body 140, respectively, and engaged in the substantially locked position, the anchoring portion 230 is operable to restrict a movement of the main body 240 relative to the valve body 140. Correspondingly, when the anchoring portion 230 is disengaged from the substantially locked position, the portable apparatus 200 is operable to be removed from the valve 100.

Returning back to the gear assembly 210, which comprises the drive gear 212 and the driven gear 216, example embodiments are operable to translate an input first torque supplied by the energy source to an output second torque using a straight or linear gear configuration. In situations wherein the rotary wheel 110 comprises a relatively large diameter, example embodiments are adjustable in one or more of a plurality of ways. In an example embodiment, the main body 240 and/or the anchoring portion 230 are adjustable (not shown) so as to increase the required distance A to fit a relatively large diameter rotary wheel 110. In another example embodiment, one or more intermediate gears (not shown) may also be provided between the drive gear 212 and the driven gear 216, which enables an increase in distance between the drive gear 212 and the driven gear 216 while substantially maintaining the desired gear ratio magnitude. In this regard, the portion of the main body 240 between the drive gear 212 and the driven gear 216 may be adjustably lengthened (not shown) in addition to or in replacement of adjustably lengthening first end portion 246 of the main body 240. Alternatively or in addition, the drive gear 212 and the driven gear 216 may be replaceable to correspondingly larger diameter gears while maintaining the same desired gear ratio. It is to be understood herein that example embodiments, including those described above and herein, are operable to adjustably secure to a plurality of different rotary valves 100 comprising a plurality of different configurations, sizes, rim 120 diameters, thicknesses, number of spokes 130, and orientation of spokes 130 relative to the rim 120, while also achieving a substantial increase in magnitude of the output torque provided to the rotary wheel 110 relative to the magnitude of the input torque applied by the energy source. It is also to be understood herein that the magnitude of the gear ratio, and corresponding increase in magnitude of the output torque relative to the magnitude of the input torque, is adjustable in a plurality of ways, such as by a combination of one or more of replacing the drive gear 212 to a smaller diameter (and corresponding number of teeth) and replacing the driven gear 216 to a larger diameter (and corresponding number of teeth). An appropriate adjustment (not shown) in the length of the anchoring portion 230 and/or the main body 240 at one or more of the first end portion 246 and the portion between the first elongated member 242c and the second elongated member 218 may also be correspondingly performed.

It is also to be understood herein that the gear assembly 210 described above, which comprises the drive gear 212 and the driven gear 216, may be in other configurations and still achieve a translation of an input first torque supplied by the energy source to an output second torque. For example, the gear assembly may be configured in a beveled gear configuration, spiral beveled gear configuration, hypoid gear configuration, helical gear configuration, worm gear configuration, and/or any other gear configuration that enables an increase in magnitude of the output torque relative to the magnitude of the input torque. Furthermore, example embodiments described herein may include a safety cover (not shown) surrounding some, most, or all of the gear assembly 210, and parts thereof, in such a way that, when in operation, an operator and/or other objects within the vicinity of the portable apparatus 200 may not accidentally come into contact with moving parts (drive and driven gears) of the gear assembly 210.

Reference is now made to FIGS. 4A-D, 5A-D, 6A-B, 7A-F, and 8A-E, which illustrates other example embodiments of a portable apparatus 400 for controlling an operation of a valve 100. As shown in FIGS. 4-8, example embodiments of the portable apparatus 400 may comprise a gear assembly 410, an anchoring portion 430, and a contacting member 420. The portable apparatus 400 may further comprise a main body 440. The main body 440 may be any one or more of a unitary body, a body comprising a plurality of fixedly secured and/or adjustable parts, an elongated body, and/or a body comprising one or more shapes, so long as the main body 440 provides for, among other things, a structurally rigid body and cooperation with at least the anchoring portion 430 to restrict undesirable movements, bending, breaking, sliding, and/or coming apart of the portable apparatus 400 from the valve 100 when in operation.

In the example embodiments shown in FIGS. 4-5, the gear assembly 410 is securably received and/or integrated in a recessed portion (not shown) of the main body 440. In the example embodiment shown in FIGS. 6-7, the gear assembly 410 may be a detachable member operable to detach from a portion 442 of the portable apparatus 400, such as the main body 440, and operable to effect the driving or rotating R3 and/or R4 of the contacting portion 420 when the gear assembly 410 is securely attached to the portion 442 of the portable apparatus 400 and when in operation.

Figure 4A:
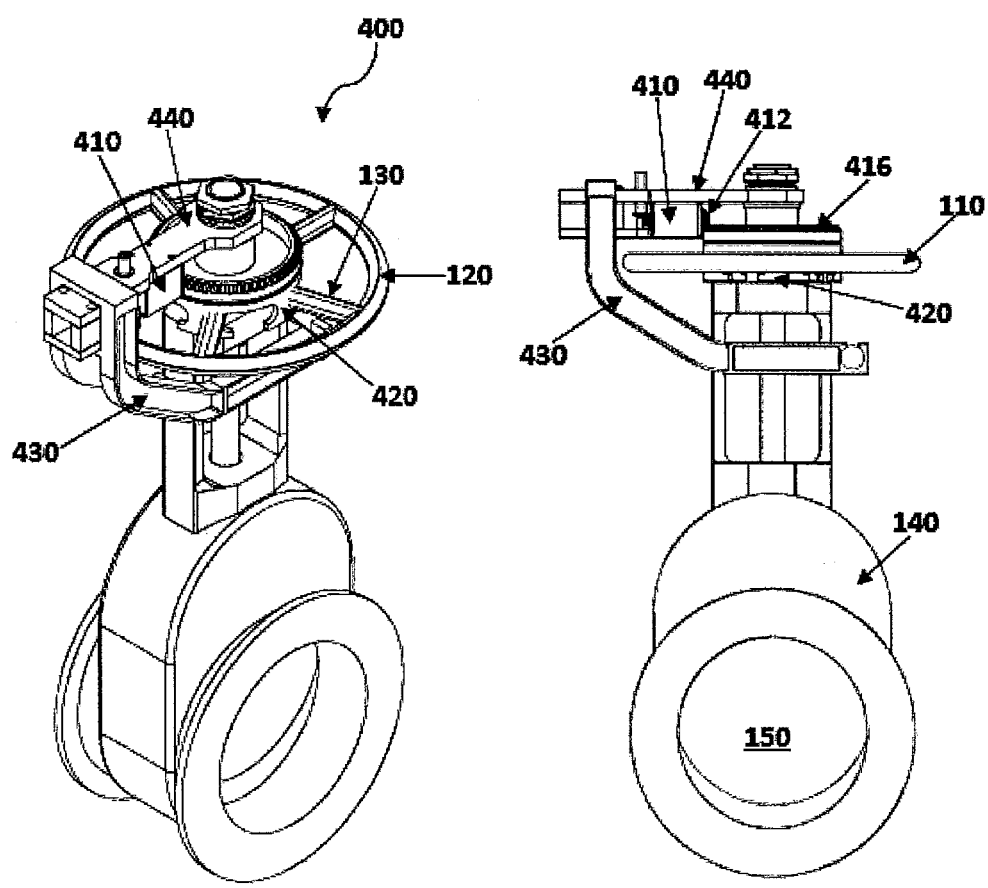
FIG. 4A is a perspective view and a side view of another example embodiment of an apparatus for use in controlling an operation of a valve comprising a planetary gear assembly.
Figure 4B:
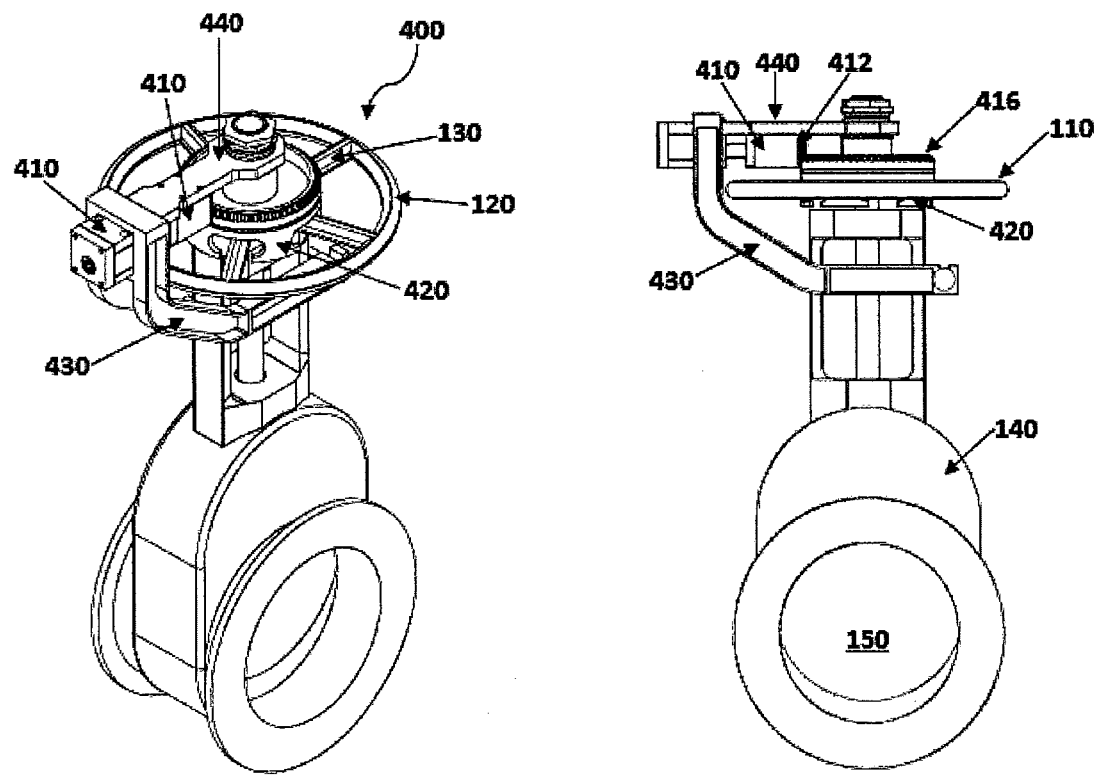
FIG. 4B is perspective view and a side view of another example embodiment of an apparatus for use in controlling an operation of a valve comprising a planetary gear assembly.
Figure 4C:
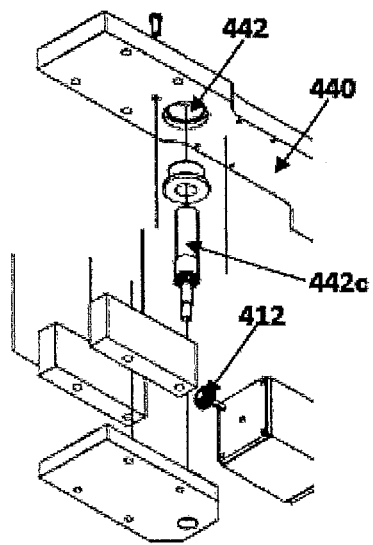
FIG. 4C is a perspective view of the example embodiment of the gear assembly of the apparatus depicted in FIG. 4A.
Figure 4D:
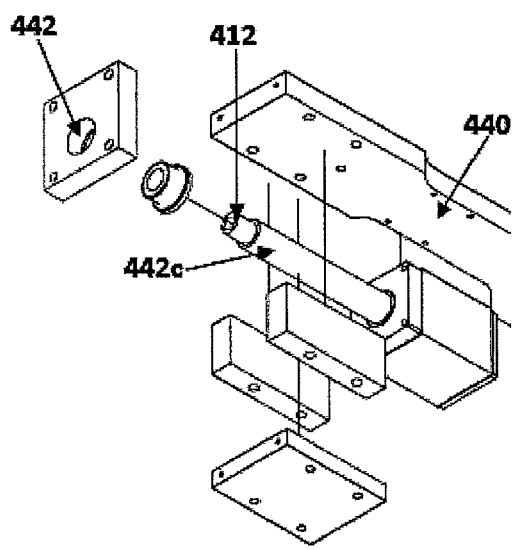
FIG. 4D is a perspective view of the example embodiment of the gear assembly of the apparatus depicted in FIG. 4B.
Figure 5A:
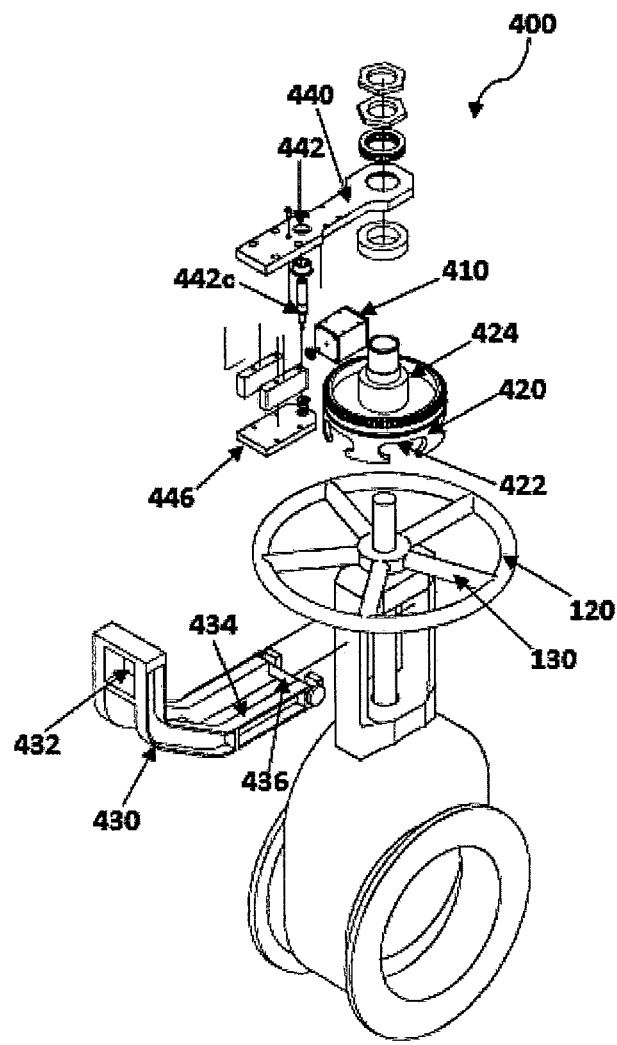
FIG. 5A is an exploded view of the example embodiment of the apparatus of FIG. 4A for use in controlling an operation of a valve.
Figure 5B:
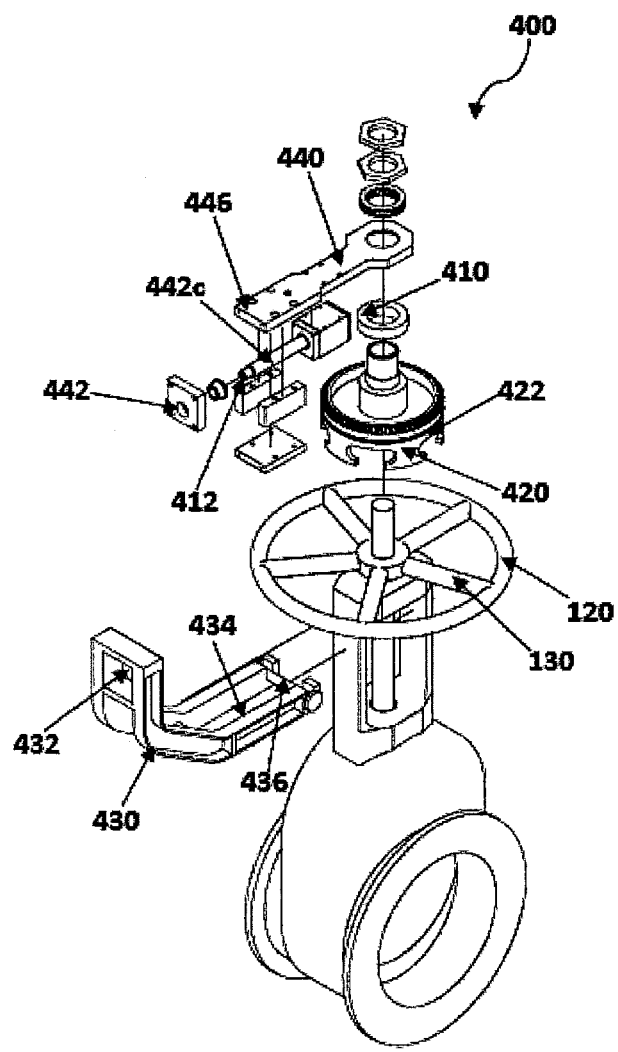
FIG. 5B is an exploded view of the example embodiment of the apparatus of FIG. 4B for use in controlling an operation of a valve.
Figure 5C:
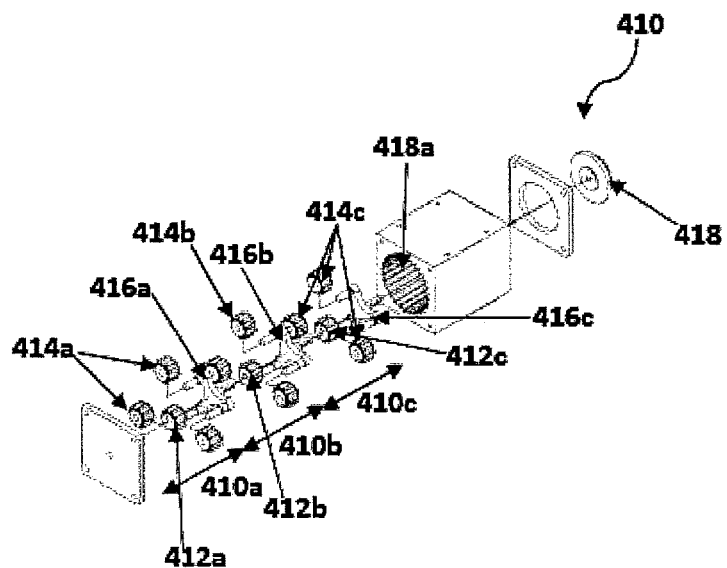
FIG. 5C is an exploded view of the gear assembly of the example embodiment of the apparatus of FIG. 4A.
Figure 5D:
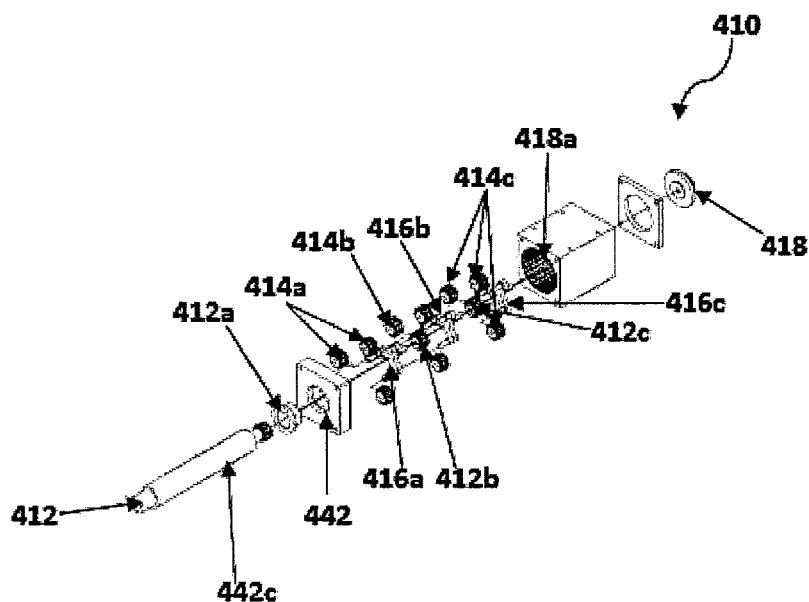
FIG. 5D is an exploded view of the gear assembly of the example embodiment of the apparatus of FIG. 4B.
Figure 6A:
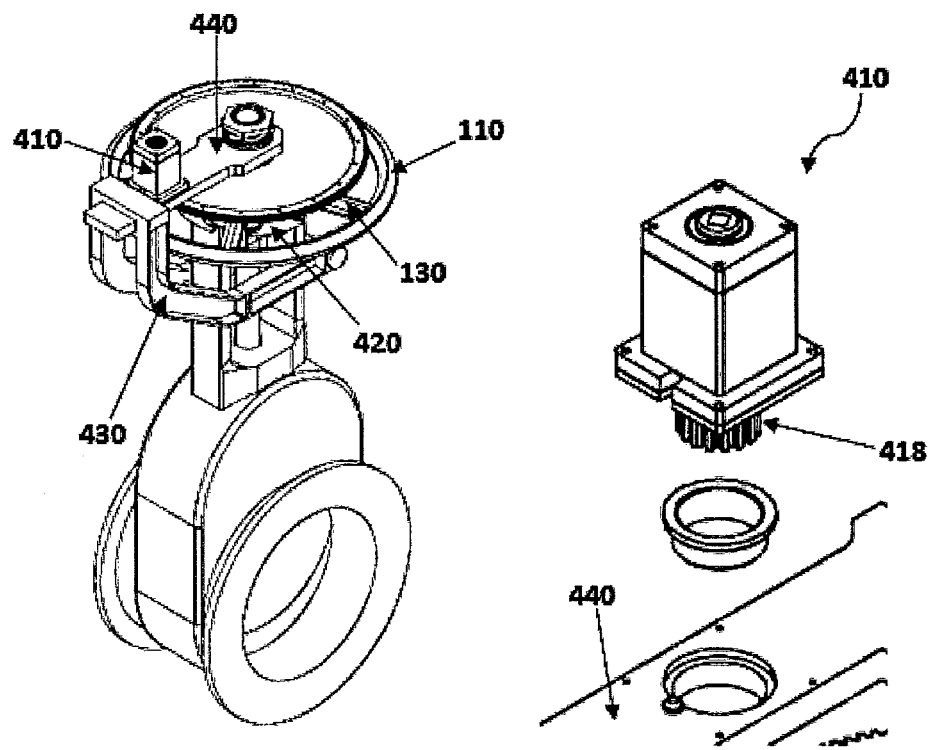
FIG. 6A is another example embodiment of an apparatus for use in controlling an operation of a valve having a detachable gear assembly and an exploded view of the example embodiment of the gear assembly.
Figure 6B:
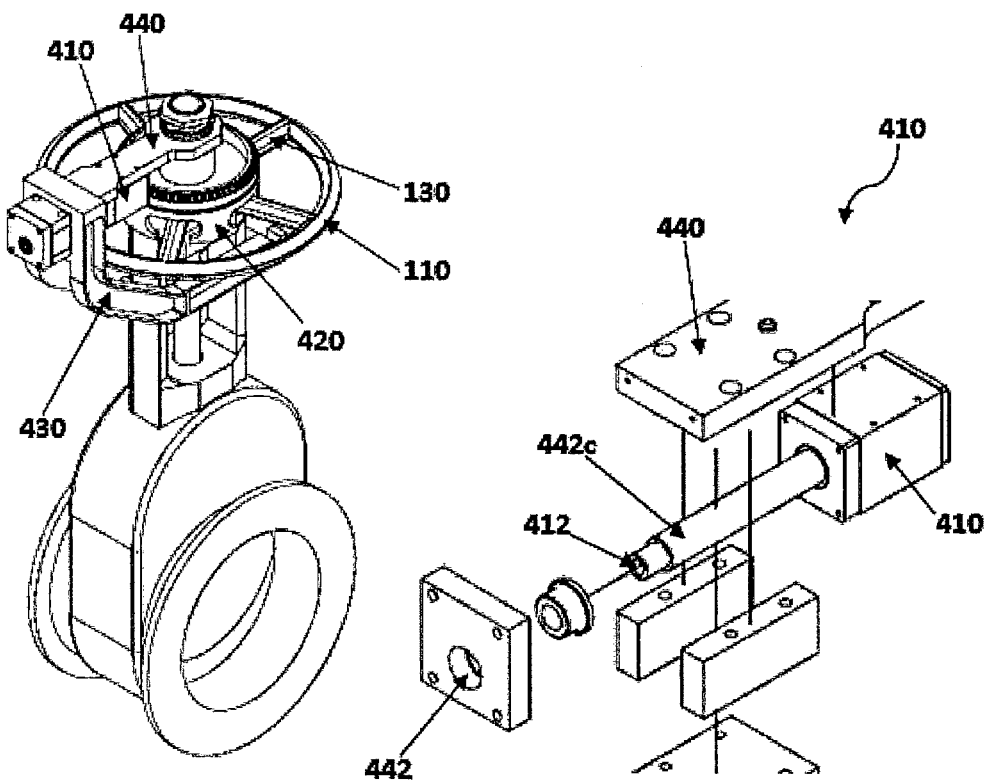
FIG. 6B is another example embodiment of an apparatus for use in controlling an operation of a valve having a detachable gear assembly and an exploded view of the example embodiment of the gear assembly.
Figure 7A:
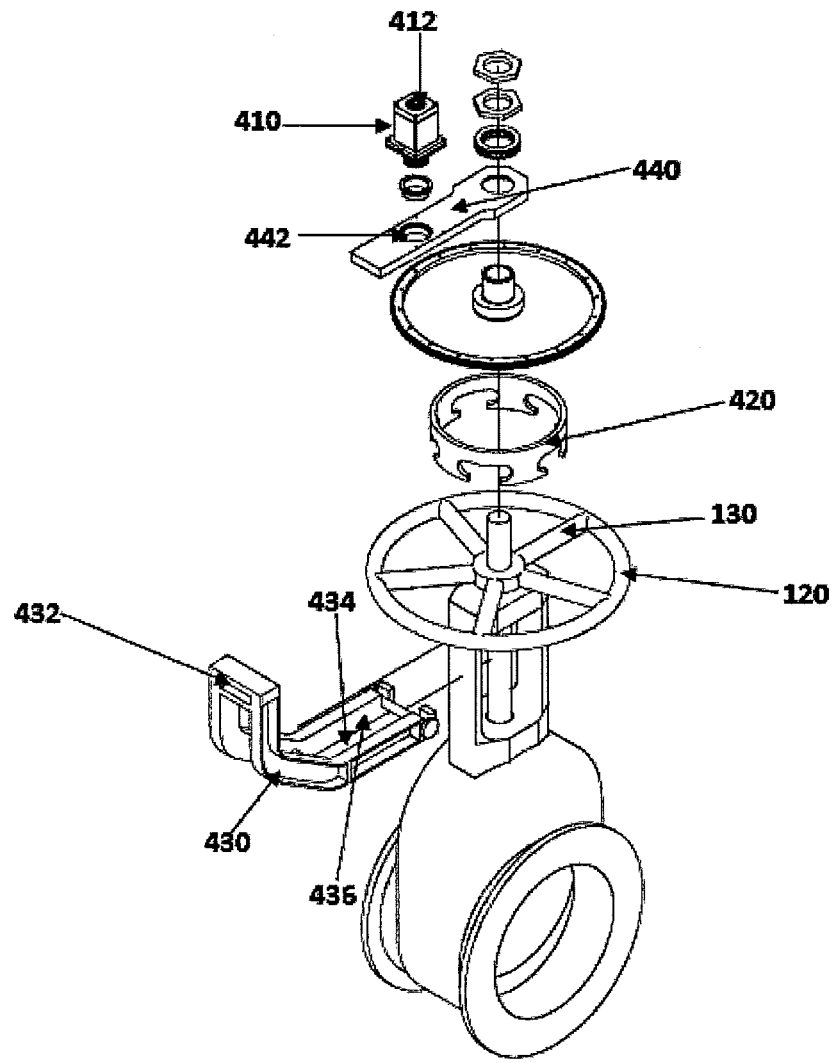
FIG. 7A is an exploded view of the example embodiment of the apparatus of FIG. 6A.
Figure 7B:
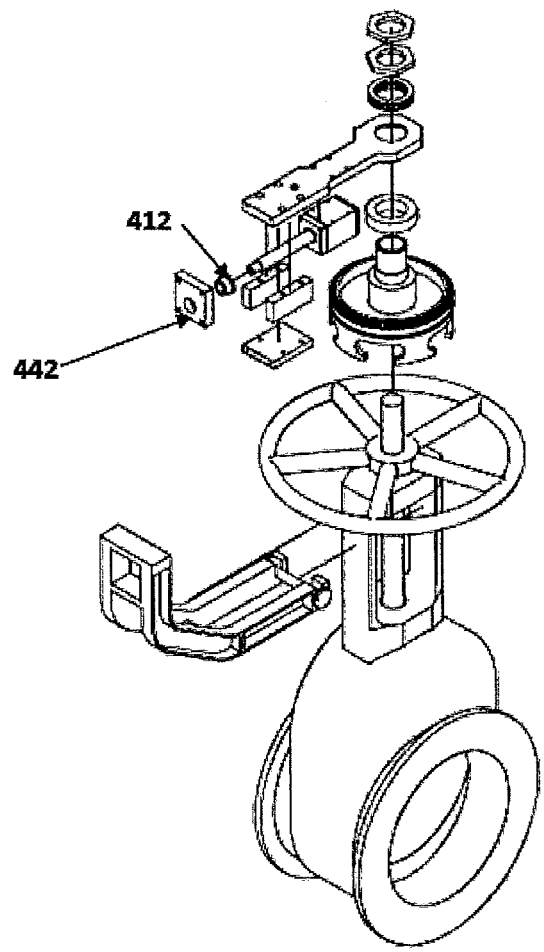
FIG. 7B is an exploded view of the example embodiment of the apparatus of FIG. 6B.
Figure 7C:
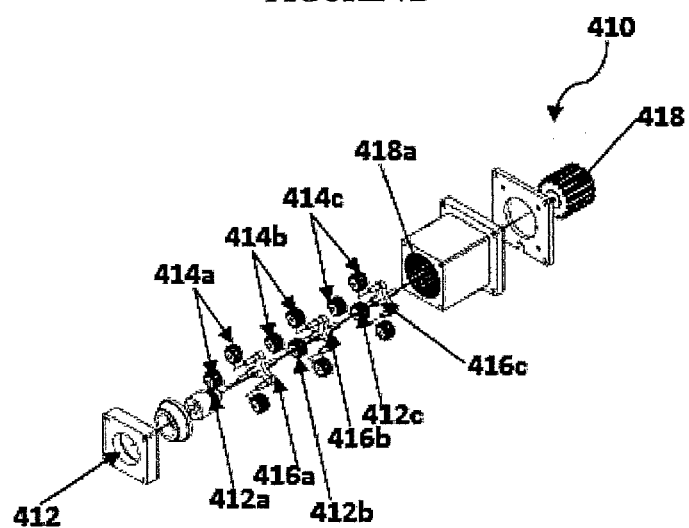
FIG. 7C is an exploded view of the gear assembly of the example embodiment of FIG. 6A.
Figure 7D:
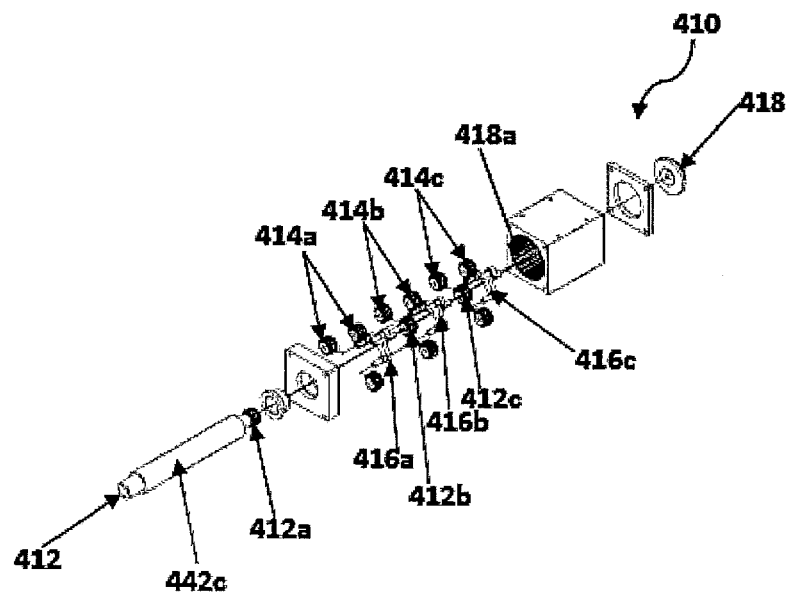
FIG. 7D is an exploded view of the gear assembly of the example embodiment of FIG. 6B.
Figures 7E, 7F:
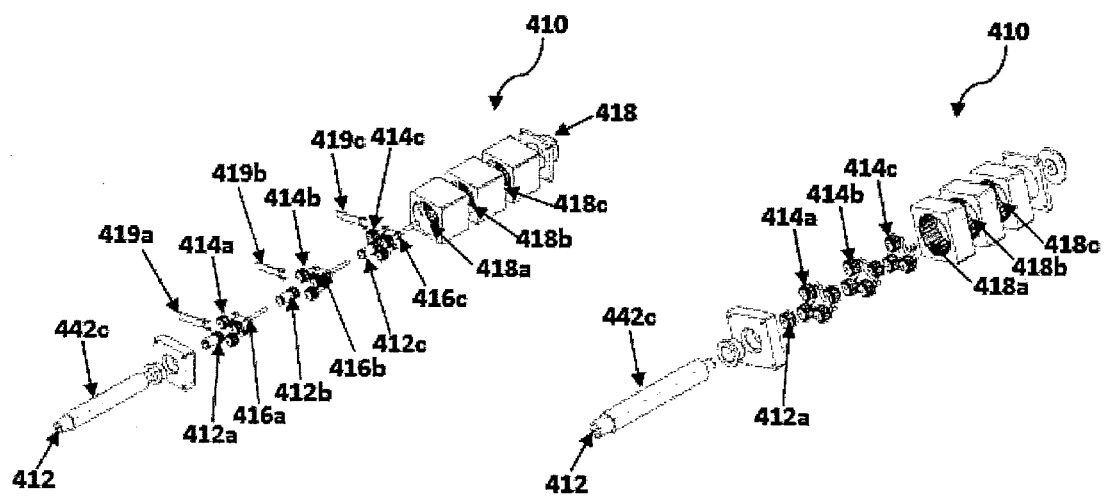
FIG. 7E is an exploded view of another example embodiment of the gear assembly of FIG. 7C.
FIG. 7F is an exploded view of another example embodiment of the gear assembly of FIG. 7D.

The gear assembly 410 comprises one or more adjustable planetary gear assemblies 410a operable to cooperatively translate an input torque provided at an input portion 442 (or 412) of the gear assembly 410 to an output torque at an output portion 418 (may also correspond to 412b, 416a, and/or 418a for embodiments comprising only one planetary gear assembly, and may also correspond to 412c, 416b, and/or 418b for embodiment comprising two planetary gear assemblies, and so on) of the gear assembly 410. In example embodiments, the output torque may be selectable from a plurality of selectable output torques. The input portion 442 is operable to receive an input torque from one or more energy sources, such as described above and herein. As shown in FIGS. 4A, 4C, 5A, and 5C, the input portion 442 may be provided on the top surface (shown) or bottom surface (not shown) of the main body 440 to allow access by the energy source from the top or bottom of the portable apparatus 400, respectively, and as shown in FIGS. 4B, 4D, 5B, and 5D, the input portion 442 may also be provided on an end surface (shown) or side surface (not shown) to allow access by the energy source from the end or side of the portable apparatus 400, respectively, in addition to or in replacement of being provided on the top or bottom surface. The output portion 418 of the gear assembly 410 is operable to drive (or rotate) R1 and/or R2 the contacting portion 420 with the output torque, which may or may not be selectable, based on the input torque when in operation. Although input portion 442 is shown in FIGS. 4A and 5A as being accessible by energy sources via an end 442 of a first elongated member 442c, it is to be understood herein that input portion 442 may also be accessible by energy sources via a recessed portion. That is, the connectivity between the input portion 442 and an energy source may be in the form of a male-female connection, female-male connection, and/or any other known ways to securely connect two parts.

The input portion 442 may comprise an input port 412. The input port 412 may comprise a first elongated member 442c having an exposable end operable to communicate with an output port (not shown) of an energy source. When in operation, the energy source may cause the first elongated member 442c to rotate in a first direction R1, a second direction R2, or any one of directions R1 and R2 while positionally secured in a substantially fixed position relative to the gear assembly 410. For example, the energy source may be a pneumatic tool, which when activated is operable to translate high pressured gas into rotation of an output port of the pneumatic tool. In this example, the output port of the pneumatic tool may comprise a corresponding recessed portion that is fixably securable to said exposed end of said first elongated member 442c. In operation, when the pneumatic tool (or other energy source) is secured to said first elongated member 442c, the output port of the pneumatic tool may be rotated and correspondingly effect said rotation R1 and/or R2 of the first elongated member 442c. It is to be understood herein that any other form of connecting or securing the input port 412 of the gear assembly 410 to the output port of the energy source may be provided in example embodiments, so long as the connecting or securing enables the energy source via its output port to effect a drive or rotation R1 and/or R2 of the input port 412 (in this case, may also comprise the first elongated member 442c) of the gear assembly 410. For example, the output port of the energy source may also comprise a protruding portion and the input port may correspondingly comprise a recessed portion (instead of or in addition to the first elongated member) operable to receive the output port of the energy source.

In a similar manner as described above, the portable apparatus 400, such as the example embodiments illustrated in FIGS. 4-8, are operable to receive an inputted first torque at the input port 412 of the gear assembly 410, and further operable to translate the input first torque to one or more of a plurality of selectable output second torques, wherein the magnitude of the selectable output second torques may be greater than the magnitude of the input first torque. Accordingly, it is recognized herein that the use of an energy source, such as a manual tool, pneumatic tool, and electrical tool, to rotate the rotary wheel using example embodiments will solve many of the existing problems described above and herein, since example embodiments provide for, among other things, less input torque requirements than would be required to rotate the same rotary wheel 110 without example embodiments of the portable apparatus (such as by using bare hands to rotate the rotary wheel).

The first elongated member 442c may be fixedly attached to a first sun gear 412a of a first planetary gear assembly 410a in such a way as to effect rotation or driving of the first sun gear 412a when the elongated member 442c is rotated or driven R1 and/or R2, as described above. For example, the first elongated member 442c may be fixably securable in a central recessed portion of the first sun gear 412a and prevented from coming away from the first sun gear 412a at one or both ends through use of one or more securing elements, such as a nut or the like. As another example, the first elongated member 442c may be fixedly secured to and/or integrated with one or more surfaces of the first sun gear 412a.

The energy source may also be fixably securable to the first sun gear 412a without use of said first elongated portion 442c in example embodiments, so long as the energy source is operable to effect rotation R1 and/or R2 of the first sun gear 412a with a first torque when the output port of the energy source is secured, directly or indirectly, to the first sun gear 412a. In such an embodiment, the first sun gear 412a performs the function of the input portion 442 of the gear assembly 410.

An example embodiment of the first planetary gear assembly 410a may comprise a first sun gear 412a, a first ring gear 418a, a plurality of first planet gears 414a (or driven gears) in communication with the first sun gear 412a and the first ring gear 418a, and a first planet carrier 416a. Each of the first planet gears 414a may comprise a central bore operable to receive an elongated member 416b of the first planet carrier 416a. Each of the elongated members 416b of the first planet carrier 416a receivable in the central bore of each first planet gear 414a is operable to define an axis of rotation B for each first planet gear 414a. Furthermore, an elongated member 442c receivable in the central bore of the first sun gear 412a is operable to define a common axis of rotation C for the first sun gear 412a, rotation of the collective first planet gears 414a around the first sun gear 412a about the common axis of rotation C, rotation of the first planet carrier 416a about the common axis of rotation C, and rotation of the first ring gear 418a about the common axis of rotation C. The first planet carrier 416a is securably attachable to one or more of a first output port 418 and a subsequent (or second) sun gear 412b for a next planetary gear assembly 410b (if provided). The first planet carrier 416a, the subsequent (or second) sun gear 412b, and/or an attachment 412b or 418 to the first planet carrier 416a and/or the subsequent (or second) sun gear 412b may serve as the output port 418 of the first planetary gear assembly 410a and/or the gear assembly 410 (if one or more subsequent planetary gear assemblies are not provided after the first planetary gear assembly 410a).

In a situation comprising one planetary gear assembly 410 and 410a, an example embodiment is operable to provide an output torque that is greater than an input torque by fixing (locking) one of the rotation of the first ring gear 418a about the axis C, the rotation of each first planet gear 414a about the axis B, and the collective rotation of the first planet gears 414a around the first sun gear 412a (that is, the rotation of the first planet carrier 416a) about the axis C. Hereinafter, example embodiments will be described having the first ring gear 418a as being fixed (locked) from rotating about the axis C.

In an example embodiment of the first planetary gear assembly 410a illustrated in FIGS. 5C, 5D, 7C, 7D, 7E, 7F, and 8, the first sun gear 412a, the first ring gear 418a, and the plurality of first planet gears 414a are fixably positioned in relation to each other in such a way that a rotation R1 and/or R2 of the first sun gear 412a about the axis C may effect a drive or rotation of each of the plurality of first planet gears 414a about the central axis B of each of the first planet gears 414a, a drive or rotation of the collective plurality of first planet gears 414a about the axis C of the first sun gear 412a, and a drive or rotation of the first planet carrier 416a about the axis C of the first sun gear 412a. In operation, when the first sun gear 412a is provided with a first input torque from the energy source, the first planetary gear assembly 410a is operable to provide a first output torque about the first output port 412b, as will be further described below. In this situation, the magnitude of the first output torque at the first output port 412b may be greater than or equal to the magnitude of the first input torque at the first input port 412a. In an example embodiment, the first output torque may have a magnitude greater than the first input torque by at least a factor of 2 (or a gear ratio having a magnitude of at least 2:1). In example embodiments, the first output torque may have a magnitude greater than the first input torque by at least a factor of 4 (or a gear ratio having a magnitude of at least 4:1), at least a factor of 8 (or a gear ratio having a magnitude of at least 8:1), or other magnitudes greater than 1 (or a gear ratio having a magnitude of greater than 1:1). As previously described, the first output port 412a may be one or more of the first planet carrier 416a, the second sun gear (if provided) 412b, and an attachment 412b or 418 to the first planet carrier 416a and/or the second sun gear 412b (if provided).

Figure 8A:
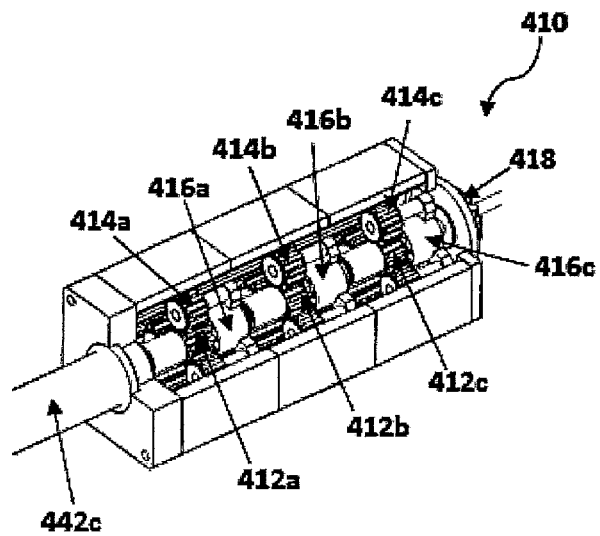
FIG. 8A is a side cross-sectional view of an example embodiment of a gear assembly without a lockable portion.
Figure 8B:
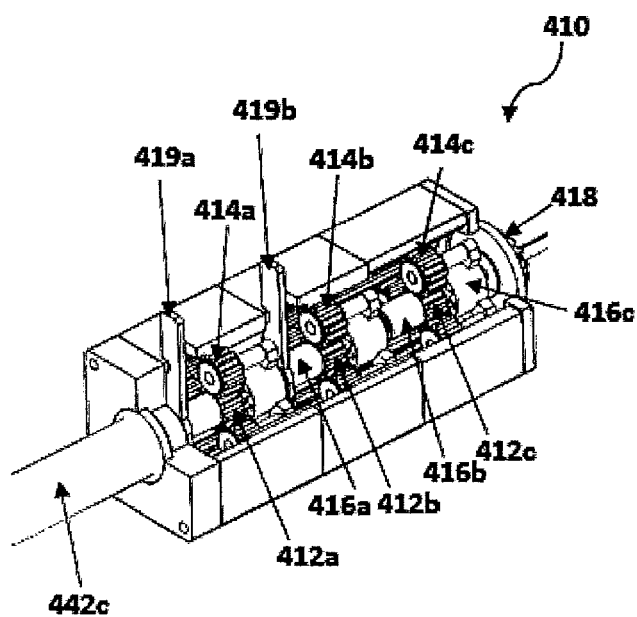
FIG. 8B is a side cross-sectional view of an example embodiment of a gear assembly with lockable portions in the locked position.
Figure 8C:
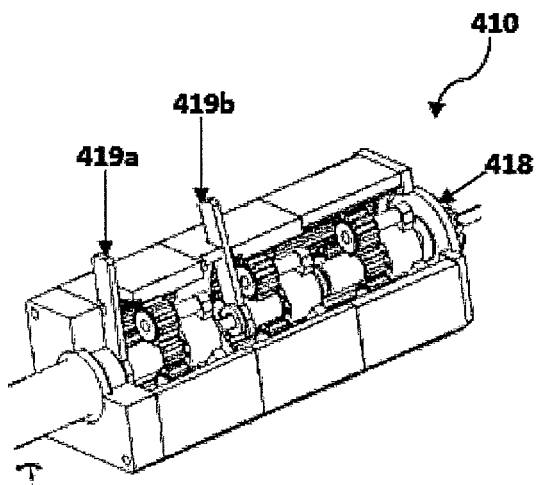
FIG. 8C is a side cross-sectional view of an example embodiment of a gear assembly with a lockable portion in the locked position and a lockable portion in the unlocked position.
Figure 8D:
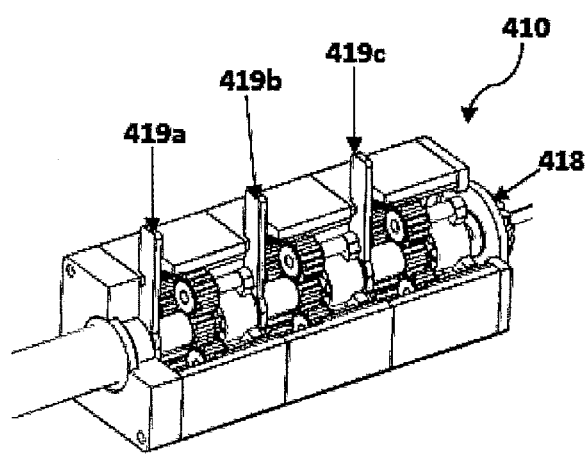
FIG. 8D is a side cross-sectional view of an example embodiment of a gear assembly with lockable portions in the locked position.
Figure 8E:
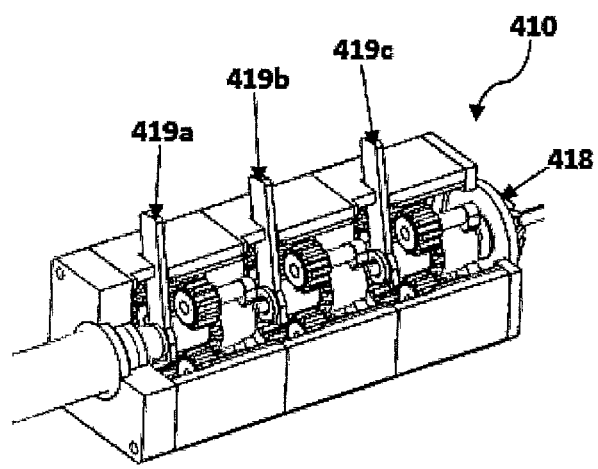
FIG. 8E is a side cross-sectional view of an example embodiment of a gear assembly with lockable portions in the unlocked position.

The first planetary gear assembly 410a may further comprise a first lockable portion 419a, the first lockable portion 419a actuatable between a locked position (such as the illustrations in FIGS. 8B, 8C, and 8D) and an unlocked position (such as the illustrations in FIGS. 8C and 8E). When the first lockable portion 419a is in the locked position, the first planetary gear assembly 410a is operable to translate a first input torque to a first output torque at first output port 412b, wherein the first output torque is greater than the first input torque. When the first lockable portion 419a is in the unlocked position, the first planetary gear assembly 410a is operable to translate a first input torque to a first output torque at first output port 412b, wherein the first output torque is substantially the same as the first input torque. An example embodiment of the first lockable portion 419a is operable to adjust the first planetary gear assembly 410a such that the first sun gear 412a directly drives or rotates the first planet carrier 416a and/or the second sun gear 412b.

When the first elongated member 419ac of the first lockable portion 419a is engaged in the locked position, the first planetary gear assembly 410a may be operable to provide a first output torque being greater than the first input torque, as described above and herein.

In example embodiments, when the first elongated member 419ac of the first lockable portion 419a is not engaged in the locked position (unlocked), the first planetary gear assembly 410a may be operable to provide a first output torque that is substantially the same as the first input torque (or a gear ratio having a magnitude of about 1:1). It is to be understood herein that example embodiments of the first planetary gear assembly 410a are also operable to provide a first output torque that is substantially the same as the first input torque (or a gear ratio having a magnitude of about 1:1) in other ways.

In an example embodiment, the size (diameter) of each first planet gear 414a may be equal to, greater than, or lesser than the size (diameter) of the first sun gear 412a. Selection of the size (diameter) of the first sun gear 412a and each first planet gear 414a may be based on one or more of the desired gear ratio of the first planetary gear assembly 410a, the desired size of the portable apparatus 400, and the desired number of planetary gear assemblies in the gear assembly 410.

In an example embodiment, the gear assembly 410 comprises a plurality of sub-gear assemblies, such as a plurality of planetary gear assemblies (FIGS. 5C, 5D, 7C, 7D, 7E, 7F, and 8 illustrate three sub-gear assemblies 410a, 410b, and 410c), that may cooperate together to provide the plurality of selectable output torques of the gear assembly 410. In the example embodiment illustrated in FIGS. 5C, 5D, 7C, 7D, 7E, 7F, and 8, the gear assembly 410 comprises a total of three planetary gear assemblies 410a, 410b, and 410c. The second planetary gear assembly 410b may be provided in such a way that the second sun gear 412b is securably attached to the first planetary carrier 416a. In this regard, the input torque (second input torque) provided to the second planetary gear assembly 410b at the second sun gear 412b is the output torque (first output torque) of the first planetary gear assembly 410a provided by the first planet carrier 416a.

The second planetary gear assembly 410b may be substantially the same as the first planetary gear assembly 410a. For example, the second planetary gear assembly 410b may comprise a sun gear 412b (a second sun gear), a plurality of planet gears 414b (second planetary gears), a ring gear 418b (a second ring gear), and a planet carrier 416c (a second planet carrier).

In a similar manner as described above for the first planetary gear assembly 410a, the second planetary gear assembly 410b may also be operable to adjustably provide an output torque (second output torque) having a magnitude that is greater than the magnitude of the input torque (second input torque) and a magnitude that is substantially equal to the magnitude of the input torque (second input torque) by engaging the second elongated member 419bc of the second lockable portion 419b to a locked position and an unlocked position, respectively.

In an example embodiment of a gear assembly 410 comprising only a first planetary gear assembly 410a and a second planetary gear assembly 410b, the input torque of the gear assembly 410 will be the input torque at the first sun gear 412a of the first planetary gear assembly 410a and the output torque of the gear assembly 410 will be the output torque at the second output port 412c (second planet carrier or attachment to the second planet carrier) of the second planetary gear assembly 410b. In an embodiment wherein the planetary gear assemblies 410a and 410b each comprise a lockable portion 419a and 419b, respectively, the gear assembly 410 may be operable to provide, for example, a maximum of four and a minimum of three selectable output torque values based on an input torque value. In a first situation, when the first lockable portion 419a is engaged in the unlocked position (the first sun gear 412a directly drives the first planet carrier 416a) and the second lockable portion 419b is engaged in the locked position (the second sun gear 412b drives the second planet gears 414b), the gear assembly 410 is operable to provide an output torque having a magnitude greater than the magnitude of the input torque by a factor of M, wherein M is the gear ratio or the ratio of the output torque of the second planetary gear assembly 410b. In a second situation, when the first lockable portion 419a is engaged in the locked position (the first sun gear 412a drives the first planet gears 414a) and the second lockable portion 419b is engaged in the unlocked position (the second sun gear 412b directly drives the second planet carrier 416b), the gear assembly 410 is operable to provide an output torque having a magnitude greater than the magnitude of the input torque by a factor of N, wherein N is the gear ratio or the ratio of the output torque of the first planetary gear assembly 410a. It is to be understood herein that when the first 410a and second 410b planetary gear assemblies are substantially the same and provide for substantially the same gear ratio, the above second and third situations will also be substantially the same, and M=N. In a third situation, when both the first 419a and second 419b lockable portions are engaged in the locked position, the gear assembly 410 is operable to provide an output torque having a magnitude greater than the magnitude of the input torque by a factor of M×N, wherein M is the gear ratio or the ratio of the output torque of the second planetary gear assembly 410b and wherein N is the gear ratio or the ratio of the output torque of the first planetary gear assembly 410a. In an example embodiment wherein the first gear assembly 410a comprises a value of N=4 and the second gear assembly 410b comprises a value of M=4, the gear assembly 410 may be selected to provide an output torque equal to the input torque, an output torque greater than the input torque by a factor of 1×N or 4, an output torque greater than the input torque by a factor of M×1 or 4, and an output torque greater than the input torque by a factor of M×N, or 16. In a fourth situation, when both the first 419a and second 419b lockable portions are engaged in the unlocked position, the gear assembly 410 is operable to provide an output torque having a magnitude that is substantially the same as the input torque.

It is to be understood herein that example embodiments of the gear assembly 410 may also comprise more than two sub-gear assemblies, such as the embodiments shown in FIGS. 5C, 5D, 7C, 7D, 7E, 7F, and 8. In general, in an example embodiment of a gear assembly comprising X planetary gear assemblies, the gear assembly may be selected to provide, for example, a maximum of $2^X$ and a minimum of X+1 selectable output torque values for a given input torque value. In an example embodiment comprising three planetary gear assemblies (not shown), wherein the first gear assembly comprises a value of N=4, the second gear assembly comprises a value of M=4, and the third gear assembly comprises a value of P=4, the gear assembly may be selected to provide: an output torque substantially equal to the input torque, an output torque greater than the input torque by a factor of about 4 (1×1×P or 1×N×1 or M×1×1), an output torque greater than the input torque by a factor of about 16 (1×N×P or M×N×1 or M×1×P), and an output torque greater than the input torque by a factor of about 64 (M×N×P). It is to be understood herein that the gear assembly may comprise one or more sub-gear assemblies that are not planetary gear assemblies and/or are not adjustable, as described above, so long as the sub-gear assemblies of the gear assembly collectively enable the gear assembly to provide a plurality of selectable output torques.

As previously described, the gear assembly 410 may be fixably securable about the main body 440 in such a way that the output port 418 (may also correspond to 412b, 416a, and/or 418a for embodiments comprising only one planetary gear assembly, and may also correspond to 412c, 416b, and/or 418b for embodiment comprising two planetary gear assemblies, and so on) may be operable to drive or rotate R3 and/or R4 the contacting member 420 when in operation. For example, the gear assembly 410 may be securably received and/or integrated in a recessed portion of the main body 440, as illustrated in FIGS. 4-5. Alternatively or in addition, the gear assembly 410 may be an attachable member operable to attach to a portion of the portable apparatus 400, such as the main body 440, in such a way as to effect the driving or rotating R3 and/or R4 of the contacting portion 420 when attached and when in operation, as illustrated in FIGS. 6-8.

As illustrated in FIGS. 4-8, an example embodiment of the portable apparatus 400 further comprises a contacting member 420. The contacting member 420 may be any one or more of a unitary body, a body comprising a plurality of fixedly secured and/or adjustable parts, an annular body, and/or a body comprising one or more shapes, so long as the contacting member 420 provides for, among other things, a structurally rigid body and cooperation with at least the main body 440 to restrict undesirable movements, bending, breaking, sliding, and/or coming apart of the contacting member 420 from the rotary wheel 110 when in operation. The contacting member 420 may be fixedly secured to main body 440, and operable to correspondingly rotate R3 and/or R4 when driven or rotated by the output port 418. The contacting member 420 comprises one or more contacting portions 422. In example embodiments, the one or more contacting portions 422 may be adjustable in such a way as to contact with and/or receive one or more portions of the rim 120 of the rotary wheel 110 and/or a portion of one or more spokes 130 of the rotary wheel 110 so as to effect rotation of the rotary wheel 110 via the contacting member 420 when the output port 418 (may also correspond to 412b, 416a, and/or 418a for embodiments comprising only one planetary gear assembly, and may also correspond to 412c, 416b, and/or 418b for embodiment comprising two planetary gear assemblies, and so on) is rotated R1 and/or R2.

The portable apparatus 400 may further comprise an anchoring portion 430. The anchoring portion 430 may be any one or more of a unitary body, a body comprising a plurality of fixedly secured and/or adjustable parts, an elongated body, and/or a body comprising one or more shapes, so long as the anchoring portion 430 provides for, among other things, a structurally rigid body and cooperation with at least the main body 440 to restrict undesirable movements, bending, breaking, sliding, and/or coming apart of the portable apparatus 400 from the valve 100 when in operation. The anchoring portion 430 may comprise a first recessed portion 432 and a second recessed portion 434. When the first recessed portion 432 is provided, as shown in FIGS. 4-8, the first recessed portion 432 is operable to receive a portion 446a of the main body 440 and secure to the main body 440 when in a substantially locked position. It is to be understood herein that said substantially locked position may also be achievable by a recessed portion 446b of the main body 440 operable to securably receive a portion (not shown) of the anchoring portion 430 in addition to or in replacement of the above embodiment. The second recessed portion 434 is adjustable (not shown) in such a way as to contact with and/or receive one or more portions of the valve body 140, and to secure to the valve body 140 when in a substantially locked position. Such is achievable by providing one or more sides 436 of the second recessed portion 434 operable to be opened, moved, and/or removed in part or in whole so as to enable receiving a portion of the valve body 140.

When the said first 432 and second 434 recessed portions are fixably secured to the main body 440 and the valve body 140, respectively, and engaged in a substantially locked position, the anchoring portion 430 is operable to restrict a movement of the main body 440 relative to the valve body 140. Correspondingly, when the anchoring portion 430 is disengaged from the substantially locked position, the portable apparatus 400 is operable to be removed from the valve 100.

In situations wherein the rotary wheel 110 of the rotary valve 100 comprises a relatively large diameter, example embodiments may be adjustable in a similar manner as described above and herein. In an example embodiment, the first end portion 446a of the main body 440 and/or the anchoring portion 430 are adjustable so as to increase the required distance A to fit a relatively large diameter rotary wheel 110. In another example embodiment, one or more intermediate gears (not shown) may also be provided between the output port 418 (may also correspond to 412b, 416a, and/or 418a for embodiments comprising only one planetary gear assembly, and may also correspond to 412c, 416b, and/or 418b for embodiment comprising two planetary gear assemblies, and so on) of the gear assembly 410 and the gear 424 of the contacting member 420, which enables an increase in distance between the output port of the gear assembly 410 and gear 424 of the contacting member 420 while substantially maintaining the desired gear ratio. In this regard, the portion of the main body 440 between the output port of the gear assembly 410 and the gear 424 of the contacting member 420 may be adjustably lengthened (not shown) in addition to or in replacement of the above adjustable lengthening of the first end portion 446a of the main body 440 and/or anchoring portion 430. Alternatively or in addition, the gear 424 of the contacting portion 420 may be replaceable to a larger diameter gear (such as the driven gear 216 in the example embodiments of FIGS. 2-3), which may result in an increase in final output torque to the contacting member 420. It is to be understood herein that example embodiments, including those described above and herein, are operable to adjustably secure to a plurality of different rotary valves 100 comprising a plurality of different configurations, sizes, diameters, thicknesses, number of spokes, and orientation of spokes relative to the rim, while also achieving a substantial increase in output torque to the rotary wheel relative to an input torque applied by the energy source. It is also to be understood herein that one or more of the planetary gear assemblies may be modular in that they may be removed and inserted as needed.

It is also to be understood herein that the gear 424 of the contacting member 420 may comprise one or more of a straight gear configuration, a beveled gear configuration, a worm gear configuration, and/or any other gear configuration that enables the output torque from the output port 418 (may also correspond to 412b, 416a, and/or 418a for embodiments comprising only one planetary gear assembly, and may also correspond to 412c, 416b, and/or 418b for embodiment comprising two planetary gear assemblies, and so on) of the gear assembly 410 to be provided to the contacting member 420.

It is also to be understood herein that each planetary gear assembly may further comprise a secondary locking portion (or a second level lock for the first locking portion) so as to fix a rotation of a second gear member. That is, in addition to the fixing from rotating of a first gear member, such as the ring gear described above and herein, a second gear member, such as the planet carrier or the planetary gears, may also be actuatable to be in a locked position (and prevented from rotating) when needed. The purpose of this secondary locking portion may be for use in urgent or emergency situations wherein an immediate stop in operation of the portable apparatus is required or desired.

While various embodiments in accordance with the disclosed principles have been described above, it should be understood that they have been presented by way of example only, and are not limiting. Thus, the breadth and scope of the example embodiments described herein should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Various terms used herein have special meanings within the present technical field. Whether a particular term should be construed as such a "term of art" depends on the context in which that term is used. "Connected to," "in communication with," "associated with," or other similar terms should generally be construed broadly to include situations both where connections and/or attachments are direct between referenced elements or through one or more intermediaries between the referenced elements. Furthermore, "recessed portion" or other similar terms should generally be construed broadly to include a cavity, a trough, a bore, a recess, a hole, and/or any other indentation, or the like, formed by a surface. Furthermore, "protruded member," "elongated member," or other similar terms should generally be construed broadly to include a shaft, a rod, a cylindrical body, a protrusion, a peak, and/or any other elongated or protruded surface or body having smooth and/or angled surfaces. These and other terms are to be construed in light of the context in which they are used in the present disclosure and as one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under Thai patent regulations and practice, or otherwise to provide organizational cues. These headings shall not limit or characterize the embodiments set out in any claims that may issue from this disclosure. Specifically, a description of a technology in the "Background" is not to be construed as an admission that technology is prior art to any embodiments in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A portable apparatus for controlling an operation of a valve, the valve having a control member and a valve body, the apparatus comprising:
   a main body;
   an anchoring portion securable to the main body, the anchoring portion operable to restrict a movement of the main body relative to the valve body when in contact with the valve body;
   a contacting member securable to the main body and rotatable relative to the main body, the contacting member operable to contact with a portion of the control member; and
   a gear assembly comprising an input portion, an output portion, and one or more sub-gear assemblies in communication with the input portion and the output portion, wherein:
   the gear assembly is securable relative to the main body and the contacting member,
   the gear assembly is configurable to provide, from the output portion, one or more of a plurality of selectable output torques to the control member via the contacting member based on an input torque received from the input portion,
   the plurality of selectable output torques is provided by at least one configurable sub-gear assembly,
   the at least one configurable sub-gear assembly is a configurable planetary gear assembly,
   the at least one configurable planetary gear assembly comprises a sun gear rotatable about a central axis, a planet carrier comprising a plurality of elongated members secured to a first surface of the planet carrier, a ring gear, and a plurality of planet gears in communication with the sun gear, the planet carrier via the elongated members, and the ring gear,
   each elongated member of the planet carrier is received in a central bore of each planet gear,
   each planet gear is operable to rotate relative to each elongated member, and
   the ring gear is configurable to provide the output torque to the output portion;
   wherein the magnitude of each selectable output torque is greater than or equal to the magnitude of the input torque.

2. The portable apparatus of claim 1, wherein the sun gear is configurable to receive the input torque from the input portion.

3. The portable apparatus of claim 1, wherein the plurality of planet gears are collectively configured to be restricted from rotating about the central axis.

4. The portable apparatus of claim 1, wherein the at least one configurable planetary gear assembly further comprises a lockable portion configurable to restrict the collective rotation of the plurality of planet gears about the central axis.

5. The portable apparatus of claim 1, wherein the gear assembly is detachable from the main body.

6. The portable apparatus of claim 1, wherein the magnitude of at least one of the selectable output torques is greater than the magnitude of the input torque by a factor of about 4 or more.

7. The portable apparatus of claim 1, wherein the magnitude of at least one of the selectable output torques is greater than the magnitude of the input torque by a factor of about 16 or more.

8. The portable apparatus of claim 1, wherein the magnitude of at least one of the selectable output torques is greater than the magnitude of the input torque by a factor of about 64 or more.

9. The portable apparatus of claim 1, wherein the anchoring portion is detachable from the main body and the valve body when not in operation.

10. A portable apparatus for controlling an operation of a valve, the valve having a control member and a valve body, the apparatus comprising:
    a main body;
    a gear assembly securable to the main body and comprising an input port, an output port, and a planetary gear assembly, the planetary gear assembly being configurable to provide one or more of a plurality of selectable output torques at the output port based on an input torque received at the input port, wherein:
    the configurable planetary gear assembly comprises a sun gear rotatable about a central axis, a planet carrier comprising a plurality of elongated members secured to a first surface of the planet carrier, a ring gear, and a plurality of planet gears in communication with the sun gear, the planet carrier via the elongated members, and the ring gear,
    each elongated member of the planet carrier is received in a central bore of each planet gear,
    each planet gear is operable to rotate relative to each elongated member, and
    the ring gear is configurable to provide the output torque to the output port;
    a contacting member securable to the main body and rotatable relative to the main body, the contacting member operable to effect rotation of the control member relative to the main body when provided with a selected output torque from the output port of the gear assembly; and
    an anchoring portion comprising a first connecting portion formed by a first surface of the anchoring portion and a second connecting portion formed by a second surface of the anchoring portion, wherein the first and second connecting portions are configurable to secure to the main body and a portion of the valve body, respectively, and wherein the anchoring portion is configurable to restrict a movement of the main body relative to the valve body;
    wherein the magnitude of each selectable output torque is greater than or equal to the magnitude of the input torque.

11. The portable apparatus of claim 10, wherein the sun gear is configurable to receive the input torque from the input port.

12. The portable apparatus of claim 10, wherein the plurality of planet gears are collectively configured to be restricted from rotating about the central axis.

13. The portable apparatus of claim 10, wherein the configurable planetary gear assembly further comprises a lockable portion configurable to restrict the collective rotation of the plurality of planet gears about the central axis.

14. The portable apparatus of claim 10, wherein the gear assembly is detachable from the main body.

15. The portable apparatus of claim 10, wherein the magnitude of at least one of the selectable output torques is greater than the magnitude of the input torque by a factor of about 4 or more.

16. The portable apparatus of claim 10, wherein the magnitude of at least one of the selectable output torques is greater than the magnitude of the input torque by a factor of about 16 or more.

17. The portable apparatus of claim 10, wherein the magnitude of at least one of the selectable output torques is greater than the magnitude of the input torque by a factor of about 64 or more.

18. The portable apparatus of claim 10, wherein the anchoring portion is detachable from the main body and the valve body when not in operation.

19. A portable apparatus for controlling an operation of a valve, the valve having a control member and a valve body, the apparatus comprising:
- a main body;
- an anchoring portion securable to the main body, the anchoring portion operable to restrict a movement of the main body relative to the valve body when in contact with the valve body;
- a contacting member securable to the main body and rotatable relative to the main body, the contacting member operable to contact with a portion of the control member; and
- a gear assembly comprising an input portion, an output portion, and one or more sub-gear assemblies in communication with the input portion and the output portion, wherein:
  - the gear assembly is securable relative to the main body and the contacting member,
  - the gear assembly is configurable to provide, from the output portion, one or more of a plurality of selectable output torques to the control member via the contacting member based on an input torque received from the input portion,
  - the plurality of selectable output torques is provided by at least one configurable sub-gear assembly,
  - the at least one configurable sub-gear assembly is a configurable planetary gear assembly,
  - the at least one configurable planetary gear assembly comprises a sun gear rotatable about a central axis, a planet carrier comprising a plurality of elongated members secured to a first surface of the planet carrier, a ring gear, and a plurality of planet gears in communication with the sun gear, the planet carrier via the elongated members, and the ring gear,
  - each elongated member of the planet carrier is received in a central bore of each planet gear,
  - each planet gear is operable to rotate relative to each elongated member, and
  - the plurality of planet gears are collectively configured to be restricted from rotating about the central axis;
  wherein the magnitude of each selectable output torque is greater than or equal to the magnitude of the input torque.

20. A portable apparatus for controlling an operation of a valve, the valve having a control member and a valve body, the apparatus comprising:
- a main body;
- a gear assembly securable to the main body and comprising an input port, an output port, and a planetary gear assembly, the planetary gear assembly being configurable to provide one of a plurality of selectable output torques at the output port based on an input torque received at the input port, wherein:
  - the configurable planetary gear assembly comprises a sun gear rotatable about a central axis, a planet carrier comprising a plurality of elongated members secured to a first surface of the planet carrier, a ring gear, and a plurality of planet gears in communication with the sun gear, the planet carrier via the elongated members, and the ring gear,
  - each elongated member of the planet carrier is received in a central bore of each planet gear,
  - each planet gear is operable to rotate relative to each elongated member, and
  - the plurality of planet gears are collectively configured to be restricted from rotating about the central axis;
- a contacting member securable to the main body and rotatable relative to the main body, the contacting member operable to effect rotation of the control member relative to the main body when provided with a selected output torque from the output port of the gear assembly; and
- an anchoring portion comprising a first connecting portion formed by a first surface of the anchoring portion and a second connecting portion formed by a second surface of the anchoring portion, wherein the first and second connecting portions are configurable to secure to the main body and a portion of the valve body, respectively, and wherein the anchoring portion is configurable to restrict a movement of the main body relative to the valve body;
wherein the magnitude of each selectable output torque is greater than or equal to the magnitude of the input torque.

* * * * *